(12) United States Patent
Ito et al.

(10) Patent No.: US 8,941,921 B2
(45) Date of Patent: Jan. 27, 2015

(54) OPTICAL SYSTEM, OPTICAL APPARATUS, AND METHOD FOR MANUFACTURING OPTICAL SYSTEM

(75) Inventors: Tomoki Ito, Kawasaki (JP); Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 307 days.

(21) Appl. No.: 13/215,226

(22) Filed: Aug. 23, 2011

(65) Prior Publication Data

US 2012/0050872 A1 Mar. 1, 2012

(30) Foreign Application Priority Data

Aug. 30, 2010 (JP) ................................ 2010-192274
Jun. 27, 2011 (JP) ................................ 2011-141816
Aug. 4, 2011 (JP) ................................ 2011-171230

(51) Int. Cl.
G02B 27/64 (2006.01)
G02B 7/08 (2006.01)
G02B 9/14 (2006.01)

(52) U.S. Cl.
CPC .. G02B 7/08 (2013.01); G02B 9/14 (2013.01); G02B 27/646 (2013.01)
USPC ........... 359/557; 359/785; 359/786; 359/787; 359/788

(58) Field of Classification Search
USPC ................................................. 359/785–789
See application file for complete search history.

(56) References Cited

U.S. PATENT DOCUMENTS

| | | | |
|---|---|---|---|
| 5,642,225 A | 6/1997 | Sato | |
| 5,715,087 A | 2/1998 | Sato | |
| 5,745,306 A * | 4/1998 | Sato | ............................... 359/745 |
| 6,115,188 A | 9/2000 | Nishio et al. | |
| 6,384,975 B1 * | 5/2002 | Hayakawa | .................... 359/557 |
| 6,728,033 B2 | 4/2004 | Hayakawa | |
| 7,411,745 B2 | 8/2008 | Wada | |
| 2002/0126383 A1 | 9/2002 | Hayakawa | |
| 2005/0248857 A1 | 11/2005 | Wada | |

FOREIGN PATENT DOCUMENTS

| | | |
|---|---|---|
| JP | 07-199123 A | 8/1995 |
| JP | 08-304698 A | 11/1996 |
| JP | 11-119092 A | 4/1999 |
| JP | 11-160617 A | 6/1999 |
| JP | 2000-356704 A | 12/2000 |
| JP | 2003-043348 A | 2/2003 |
| JP | 2003-050348 A | 2/2003 |
| JP | 2004-126397 A | 4/2004 |
| JP | 2005-321574 A | 11/2005 |
| JP | 2008-145584 A | 6/2008 |
| JP | 2008-233585 A | 10/2008 |
| JP | 2010-160240 A | 7/2010 |
| JP | 2011-002563 A | 1/2011 |

* cited by examiner

Primary Examiner — Arnel C Lavarias
(74) Attorney, Agent, or Firm — Miles & Stockbridge P.C.

(57) ABSTRACT

An optical system includes, in order from an object side, a first lens group having positive refractive power, a second lens group having negative refractive power, and a third lens group having positive refractive power. The second lens group is moved upon carrying out focusing from an infinitely distant object to a close object, at least a portion of the third lens group is moved in a direction including a component perpendicular to an optical axis, and given conditional expressions is satisfied. Accordingly, an optical system excellently suppressing variations in aberrations generated upon vibration reduction, an optical apparatus equipped therewith, and a method for manufacturing the optical system are provided.

24 Claims, 16 Drawing Sheets

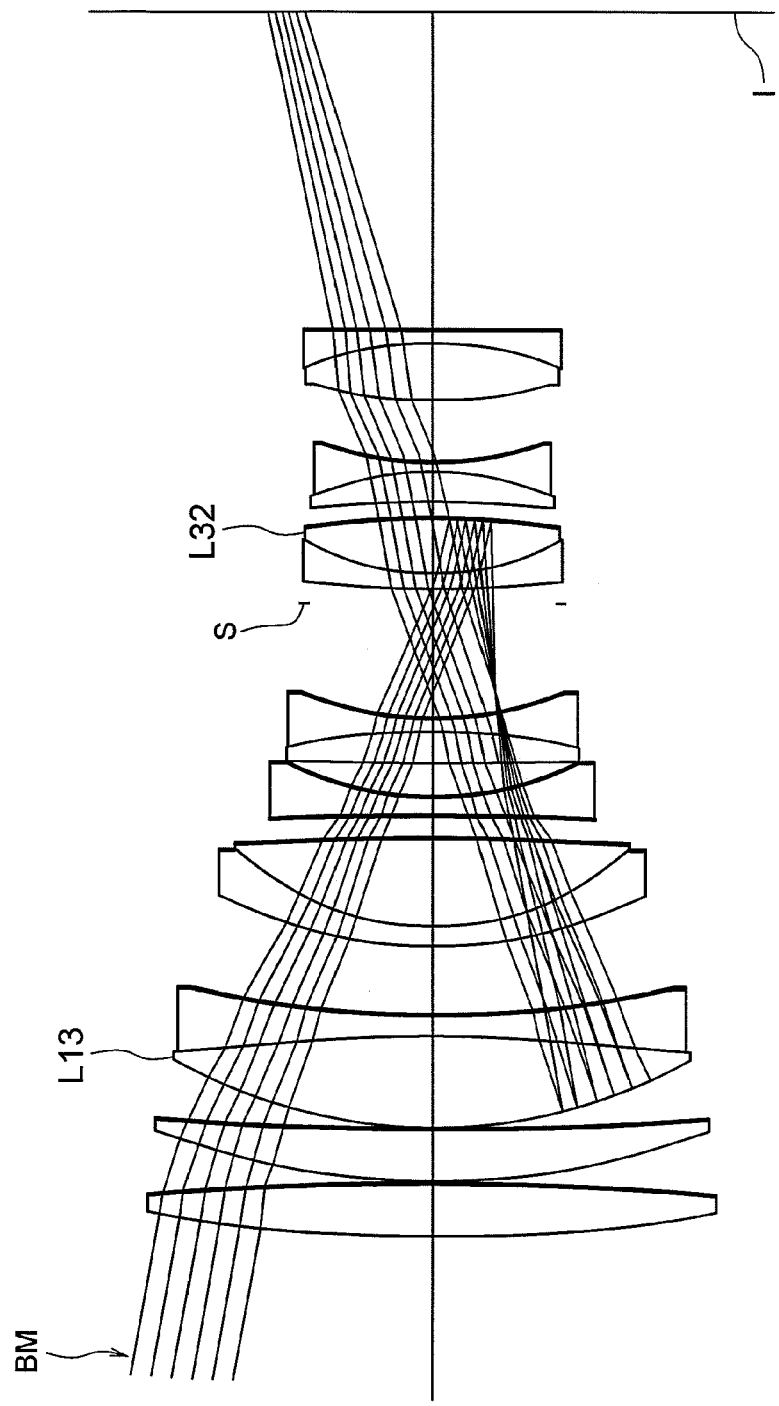

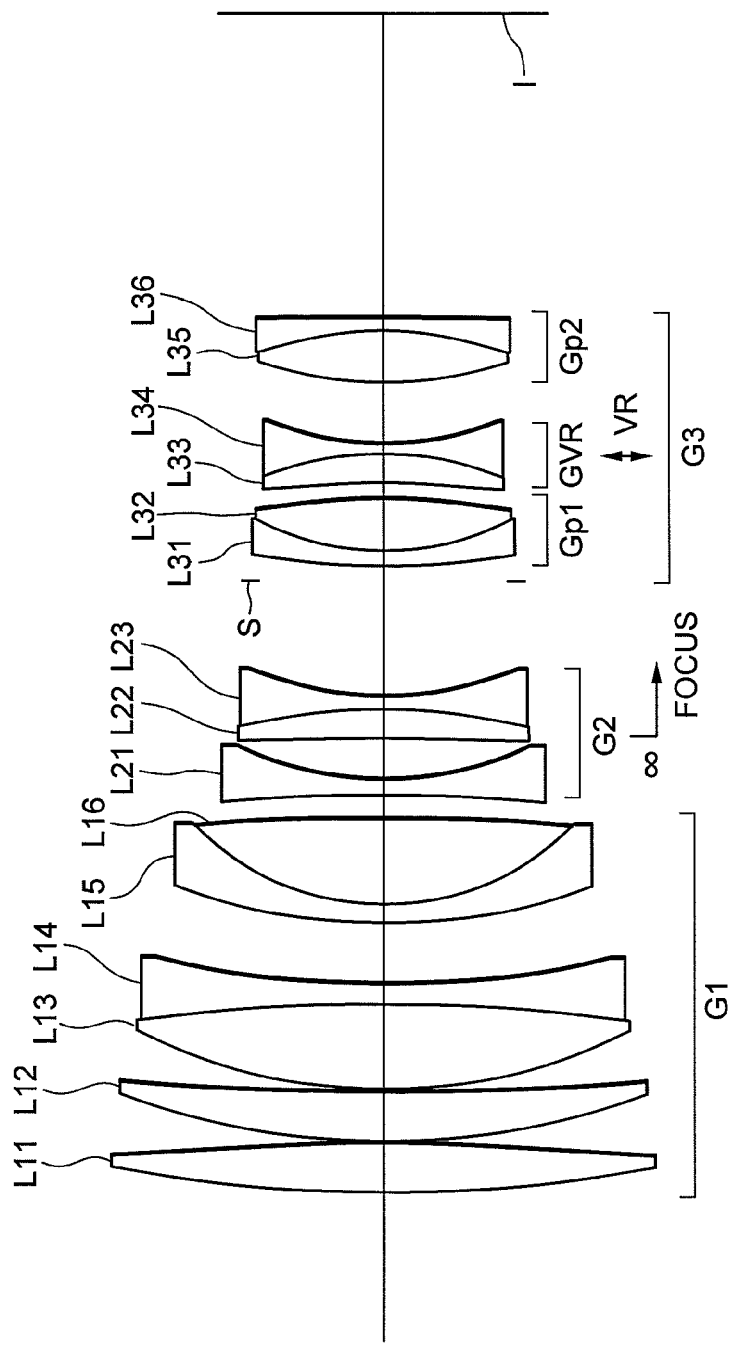

OPTICAL SYSTEM, OPTICAL APPARATUS, AND METHOD FOR MANUFACTURING OPTICAL SYSTEM

The disclosure of the following priority applications are herein incorporated by reference:

Japanese Patent Application No. 2010-192274 filed on Aug. 30, 2010;
Japanese Patent Application No. 2011-141816 filed on Jun. 27, 2011; and
Japanese Patent Application No. 2011-171230 filed on Aug. 4, 2011.

BACKGROUND OF THE INVENTION

1. Field of the Invention

The present invention relates to an optical system, an optical apparatus equipped therewith, and a method for manufacturing the optical system.

2. Related Background Art

A lot of optical systems suitable for a film camera, an electronic still camera, a video camera, and the like have been proposed (for example, see Japanese Patent Application Laid-Open No. 2008-145584). Regarding such optical systems, not only aberration correction ability, but also request for suppressing ghost images and flare, which deteriorate optical performance become increasingly strong. Accordingly, higher optical performance is required to antireflection coatings applied to a lens surface, so that in order to meet such request, multi-layered design technology and multi-layered coating technology are continuously progressing (for example, see Japanese Patent Application Laid-Open No. 2000-356704).

However, conventional optical systems described above have had a problem that variations in aberrations upon vibration reduction are large. In addition, there has been a problem that reflection light producing ghost images and flare are liable to be generated from optical surfaces in such an optical system.

SUMMARY OF THE INVENTION

The present invention is made in view of the above-described problems, and has an object to provide an optical system having excellent optical performance with further suppressing ghost images and flare and excellently controlling variations in various aberrations generated upon vibration reduction, an optical apparatus equipped therewith, and a method for manufacturing the optical system.

According to a first aspect of the present invention, there is provided an optical system comprising, in order from an object: a first lens group having positive refractive power; a second lens group having negative refractive power; and a third lens group having positive refractive power, the second lens group being movable upon carrying out focusing from an infinitely distant object to a close object, at least a portion of the third lens group being movable in a direction including a component perpendicular to an optical axis, and the following conditional expressions (1), (2) and (3) being satisfied:

$$0.30 < f1/f < 0.60 \tag{1}$$

$$0.10 < (-f2)/f < 0.60 \tag{2}$$

$$0.30 < f3/f < 0.60 \tag{3}$$

where f denotes a focal length of the optical system, f1 denotes a focal length of the first lens group, f2 denotes a focal length of the second lens group, and f3 denotes a focal length of the third lens group.

According to a second aspect of the present invention, there is provided an optical apparatus equipped with the optical system according to the first aspect.

According to a third aspect of the present invention, there is provided a method for manufacturing an optical system including, in order from the object side, a first lens group having positive refractive power, a second lens group having negative refractive power, and a third lens group having positive refractive power, the method comprising steps of: disposing the first lens group, the second lens group and the third lens group with satisfying the following conditional expressions (1), (2) and (3):

$$0.30 < f1/f < 0.60 \tag{1}$$

$$0.10 < (-f2)/f < 0.60 \tag{2}$$

$$0.30 < f3/f < 0.60 \tag{3}$$

where f denotes a focal length of the optical system, f1 denotes a focal length of the first lens group, f2 denotes a focal length of the second lens group, and f3 denotes a focal length of the third lens group; disposing the second lens group movably upon carrying out focusing from an infinitely distant object to a close object; and disposing at least a portion of the third lens group movably in a direction including a component perpendicular to an optical axis.

The present invention makes it possible to provide an optical system with further suppressing ghost images and flare and excellently controlling variations in various aberrations generated upon vibration reduction, an optical apparatus equipped therewith, and a method for manufacturing the optical system.

BRIEF DESCRIPTION OF THE DRAWINGS

FIGS. 2A and 2B are graphs showing aberrations of the optical system according to Example 1 upon focusing on an infinitely distant object, in which FIG. 2A shows various aberrations, and FIG. 2B shows coma upon carrying out vibration reduction with respect to rotational camera shake of 0.3 degrees.

FIG. 3 is a sectional view showing the lens configuration of the optical system seen from another point of view according to Example 1 of the present application, and is an explanatory view, in which light rays reflected from a first-ghost-generating surface are reflected by a second-ghost-generating surface.

FIG. 4 is a sectional view showing a lens configuration of an optical system according to Example 2 of the present application.

FIGS. 5A and 5B are graphs showing aberrations of the optical system according to Example 2 upon focusing on an infinitely distant object, in which FIG. 5A shows various aberrations, and FIG. 5B shows coma upon carrying out vibration reduction with respect to rotational camera shake of 0.3 degrees.

FIGS. 7A and 7B are graphs showing aberrations of the optical system according to Example 3 upon focusing on an infinitely distant object, in which FIG. 7A shows various aberrations, and FIG. 7B shows coma upon carrying out vibration reduction with respect to rotational camera shake of 0.3 degrees.

DESCRIPTION OF THE MOST PREFERRED EMBODIMENT

Figure 1:
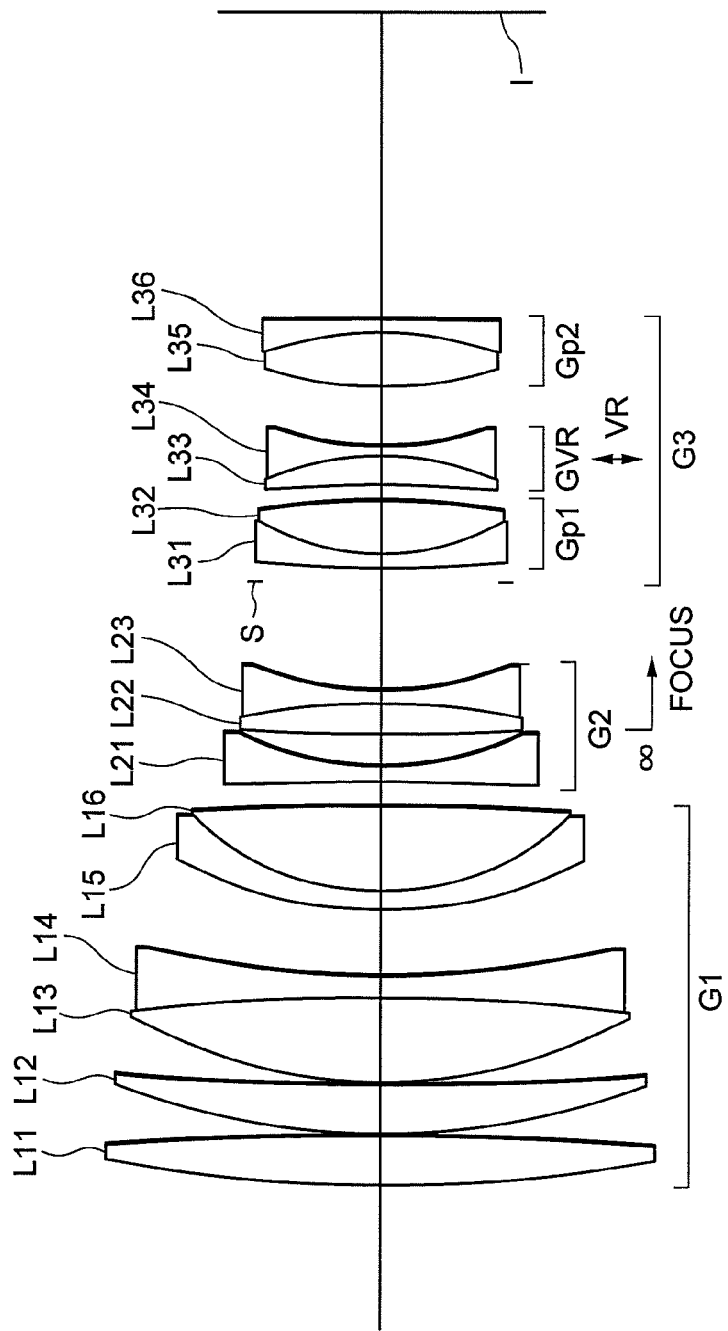
FIG. 1 is a sectional view showing a lens configuration of an optical system according to Example 1 of the present application.

An optical system, an optical apparatus equipped therewith, and a method for manufacturing the optical system according to the present application are explained below.

An optical system according to the present application includes, in order from an object side, a first lens group having positive refractive power, a second lens group having negative refractive power, and a third lens group having positive refractive power. The second lens group is movable upon carrying out focusing from an infinitely distant object to a close object. At least a portion of the third lens group is movable in a direction including a component perpendicular to an optical axis. The following conditional expressions (1), (2) and (3) are satisfied:

$$0.30 < f1/f < 0.60 \quad (1)$$

$$0.10 < (-f2)/f < 0.60 \quad (2)$$

$$0.30 < f3/f < 0.60 \quad (3)$$

where f denotes a focal length of the optical system, f1 denotes a focal length of the first lens group, f2 denotes a focal length of the second lens group, and f3 denotes a focal length of the third lens group.

As described above, in an optical system according to the present application, with moving the second lens group along the optical axis as a focusing lens group upon carrying out focusing from an infinitely distant object to a close object, it becomes possible to suppress variations in aberrations upon focusing. Moreover, the focusing lens group can be lightened, so that a fast focusing can be realized.

As described above, in an optical system according to the present application, with moving at least a portion of the third lens group as a vibration reduction lens group in a direction including a component perpendicular to the optical axis, it becomes possible to carry out correction of an image blur (vibration reduction) caused by a camera shake. Moreover, variations in aberrations upon vibration reduction can be small.

Conditional expression (1) defines the focal length of the first lens group with respect to the focal length of the optical system of the present application. With satisfying conditional expression (1), an optical system according to the present application makes it possible to prevent the total lens length thereof from getting large, so that it becomes possible to excellently correct curvature of field and coma.

When the ratio f1/f is equal to or exceeds the upper limit of conditional expression (1), refractive power of the first lens group becomes small, so that the total lens length of the optical system becomes large. Moreover, it becomes difficult to secure the light amount of around a corner, so that it is undesirable. Furthermore, when refractive power of the third lens group is made large so as to shorten the total lens length, it becomes difficult to correct spherical aberration and curvature of field, so that it is undesirable. In order to secure the effect of the present application, it is preferable to set the upper limit of conditional expression (1) to 0.59.

On the other hand, when the ratio f1/f is equal to or falls below the lower limit of conditional expression (1), refractive power of the first lens group becomes large, so that it becomes difficult to correct curvature of field and coma. Accordingly, it is undesirable. In order to secure the effect of the present application, it is preferable to set the lower limit of conditional expression (1) to 0.40.

Conditional expression (2) defines the focal length of the second lens group with respect to the focal length of the optical system. With satisfying conditional expression (2), an optical system according to the present application makes it possible to excellently correct spherical aberration and curvature of field, so that the total lens length of an optical system can be prevented from getting large.

When the ratio (-f2)/f is equal to or exceeds the upper limit of conditional expression (2), refractive power of the second lens group becomes small, so that it becomes impossible to sufficiently correct spherical aberration and curvature of field. Accordingly, it is undesirable. Moreover, a moving amount of the second lens group as the focusing lens group upon carrying out focusing becomes large, so that the total lens length of the optical system becomes large. Accordingly, it is undesirable. In order to secure the effect of the present application, it is preferable to set the upper limit of conditional expression (2) to 0.50.

On the other hand, when the ratio (-f2)/f is equal to or falls below the lower limit of conditional expression (2), refractive power of the second lens group becomes large, so that it becomes difficult to correct spherical aberration and curvature of field. Accordingly, it is undesirable. In order to secure the effect of present application, it is preferable to set the lower limit of conditional expression (2) to 0.20.

Conditional expression (3) defines the focal length of the third lens group with respect to the focal length of the optical system according to the present application. With satisfying conditional expression (3), it becomes possible to excellently correct spherical aberration, coma and distortion, and a back focal length can sufficiently be secured.

When the ratio f3/f is equal to or exceeds the upper limit of conditional expression (3), refractive power of the third lens group becomes small, so that the total lens length of the optical system becomes large. Accordingly, it is undesirable. When refractive power of the first lens group and the second lens group is made large so as to mitigate the effect, it becomes difficult to correct spherical aberration, coma and distortion, so that it is undesirable. In order to secure the effect of the present application, it is preferable to set the upper limit of conditional expression (3) to 0.59.

On the other hand, when the ratio f3/f is equal to or falls below the lower limit of conditional expression (3), refractive power of the third lens group becomes large. As a result, it becomes difficult to correct spherical aberration and coma. Moreover, it becomes difficult to secure the back focal length, so that it is undesirable. When refractive power of the second lens group is made large so as to secure the back focal length, spherical aberration becomes difficult to be corrected, so that it is undesirable. In order to secure the effect of the present application, it is preferable to set the lower limit of conditional expression (3) to 0.40.

With this configuration described above, it becomes possible to realize an optical system capable of suppressing variations in aberrations upon vibration reduction and upon carrying out focusing.

In an optical system according to the present application, it is preferable that the at least a portion of the third lens group is a negative lens group having negative refractive power. With this configuration, it becomes possible to suppress variations in aberrations upon vibration reduction.

In an optical system according to the present application, the following conditional expression (4) is preferably satisfied:

$$0.50<(-fVR)/f3<1.00 \quad (4)$$

where fVR denotes a focal length of the negative lens group in the third lens group, and f3 denotes a focal length of the third lens group.

Conditional expression (4) defines the focal length of the negative lens in the third lens group with respect to the focal length of the third lens group. With satisfying conditional expression (4), an optical system according to the present application makes it possible to prevent the optical system from getting large and excellently correct decentering coma upon vibration reduction.

When the ratio $(-fVR)/f3$ is equal to or exceeds the upper limit of conditional expression (4), refractive power of the negative lens group in the third lens group, in other words, refractive power of the vibration reduction lens group becomes small. Accordingly, a moving amount of the vibration reduction lens group upon vibration reduction becomes large, so that an outer diameter of the lens barrel and the outer diameter of the vibration reduction unit become large. Accordingly, it is undesirable. Moreover, when refractive power of the third lens group is made small so that the ratio $(-fVR)/f3$ does not exceed the upper limit of conditional expression (4), the total lens length of the optical system becomes large, so that it is undesirable. In order to secure the effect of the present application, it is desirable to set the upper limit of conditional expression (4) to 0.90.

On the other hand, when the ratio $(-fVR)/f3$ is equal to or falls below the lower limit of conditional expression (4), refractive power of the vibration reduction lens group becomes large, so that it becomes difficult to correct decentering coma upon vibration reduction. Accordingly, it is undesirable. In order to secure the effect of the optical system of the present application, it is desirable to set the lower limit of conditional expression (4) to 0.55.

In an optical system according to the present application, it is preferable that the third lens group includes a first positive lens group having positive refractive power disposed to the object side of the negative lens group, and a second positive lens group having positive refractive power disposed to the image side of the negative lens group. With this configuration, it becomes possible to suppress variations in aberrations upon vibration reduction.

In an optical system according to the present application, the following conditional expression (5) is preferably satisfied:

$$0.60<(-fVR)/fp2<1.50 \quad (5)$$

where fVR denotes a focal length of the negative lens group in the third lens group, and fp2 denotes a focal length of the second positive lens group.

Conditional expression (5) defines the focal length of the negative lens group in the third lens group with respect to the focal length of the second positive lens group in the third lens group. With satisfying conditional expression (5), an optical system according to the present application makes it possible to prevent the optical system from getting large and excellently correct decentering coma upon vibration reduction.

When the ratio $(-fVR)/fp2$ is equal to or exceeds the upper limit of conditional expression (5), refractive power of the negative lens group in the third lens group, in other words, the vibration reduction lens group becomes small. As a result, a moving amount of the vibration reduction lens group upon vibration reduction becomes large, so that an outer diameter of the vibration reduction unit and an outer diameter of the lens barrel become large. Accordingly, it is undesirable. In order to secure the effect of the optical system of the present application, it is desirable to set the upper limit of conditional expression (5) to 1.30.

On the other hand, when the ratio $(-fVR)/fp2$ is equal to or falls below the lower limit of conditional expression (5), refractive power of the vibration reduction lens group becomes large, so that it becomes difficult to correct decentering coma upon vibration reduction. Accordingly, it is undesirable. In order to secure the effect of the present application, it is desirable to set the lower limit of conditional expression (5) to 0.70.

In an optical system according to the present application, the first positive lens group in the third lens group is preferably composed of a cemented lens constructed by a positive lens cemented with a negative lens. With this configuration, it becomes possible to make the lens barrel downsized.

In an optical system according to the present application, the second lens group preferably includes two negative lenses and one positive lens. With this configuration, it becomes possible to suppress variations in aberrations upon focusing.

An optical apparatus according to the present application is equipped with the above-described optical system. With this configuration, it becomes possible to realize an optical apparatus excellently suppressing variations in aberrations upon vibration reduction.

A method for manufacturing an optical system according to the present application is a method for manufacturing an optical system including, in order from an object side, a first lens group having positive refractive power, a second lens group having negative refractive power, and a third lens group having positive refractive power, the method comprising steps of:

disposing the first lens group, the second lens group and the third lens group with satisfying the following conditional expressions (1), (2) and (3):

$$0.30<f1/f<0.60 \quad (1)$$

$$0.10<(-f2)/f<0.60 \quad (2)$$

$$0.30<f3/f<0.60 \quad (3)$$

where f denotes a focal length of the optical system, f1 denotes a focal length of the first lens group, f2 denotes a focal length of the second lens group, and f3 denotes a focal length of the third lens group;

disposing the second lens group movably upon carrying out focusing from an infinitely distant object to a close object; and disposing at least a portion of the third lens group movably in a direction including a component perpendicular to an optical axis.

With this method for manufacturing an optical system, it becomes possible to manufacture an optical system capable of suppressing variations in aberrations upon vibration reduction.

Then, an optical system, an optical apparatus equipped therewith, and a method for manufacturing the optical system seen from another point of view are explained below.

An optical system seen from another point of view according to the present application includes, in order from an object side, a first lens group having positive refractive power, a second lens group having negative refractive power, and a third lens group having positive refractive power. The second lens group is movable upon carrying out focusing from an infinitely distant object to a close object. At least a portion of the third lens group is movable in a direction including a component perpendicular to an optical axis. The following conditional expressions (1), (2) and (3) are satisfied:

$$0.30 < f1/f < 0.60 \quad (1)$$

$$0.10 < (-f2)/f < 0.60 \quad (2)$$

$$0.30 < f3/f < 0.60 \quad (3)$$

where f denotes a focal length of the optical system, f1 denotes a focal length of the first lens group, f2 denotes a focal length of the second lens group, and f3 denotes a focal length of the third lens group.

As described above, in an optical system seen from another point of view according to the present application, with moving the second lens group along the optical axis as a focusing lens group upon carrying out focusing from an infinitely distant object to a close object, it becomes possible to suppress variations in aberrations upon focusing. Moreover, the focusing lens group can be lightened, so that a fast focusing can be realized.

As described above, in an optical system seen from another point of view according to the present application, with moving at least a portion of the third lens group as a vibration reduction lens group in a direction including a component perpendicular to the optical axis, it becomes possible to carry out correction of an image blur (vibration reduction) caused by a camera shake. Moreover, variations in aberrations upon vibration reduction can be small.

Conditional expression (1) defines the focal length of the first lens group with respect to the focal length of the optical system of the present application. However, conditional expression (1) has already been explained above, so that duplicated explanations are omitted.

Conditional expression (2) defines the focal length of the second lens group with respect to the focal length of the optical system. However, conditional expression (2) has already been explained above, so that duplicated explanations are omitted.

Conditional expression (3) defines the focal length of the third lens group with respect to the focal length of the optical system according to the present application. However, conditional expression (3) has already been explained above, so that duplicated explanations are omitted.

In an optical system seen from another point of view according to the present application, at least one optical surface among optical surfaces of the first lens group through the third lens group is applied with an antireflection coating, and the antireflection coating includes at least one layer that is formed by a wet process. With this configuration, an optical system seen from another point of view according to the present application makes it possible to suppress ghost images and flare generated by the light rays from the object reflected from the optical surfaces, thereby realizing excellent optical performance.

Moreover, in an optical system seen from another point of view according to the present application, the antireflection coating is a multi-layered film, and the layer formed by the wet process is preferably the outermost layer among the layers composing the multi-layered film. With this configuration, since difference in refractive index with respect to the air can be small, reflection of light can be small, so that ghost images and flare can further be suppressed.

In an optical system seen from another point of view according to the present application, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can further be suppressed.

Moreover, in an optical system seen from another point of view according to the present application, the optical surface on which the antireflection coating is applied is preferably a concave surface seen from an aperture stop. Since reflection light rays are liable to be generated on a concave surface seen from the aperture stop among optical surfaces in the first lens group through the third lens group, with applying the antireflection coating on such an optical surface, ghost images and flare can effectively be suppressed.

In an optical system seen from another point of view according to the present application, it is preferable that, the concave surface on which the antireflection coating is applied as seen from the aperture stop is an image side lens surface. Since the image side concave surface as seen from the aperture stop among optical surfaces in the first lens group through the third lens group tends to generate reflection light, with applying the antireflection coating on such an optical surface, ghost images and flare can effectively be suppressed.

In an optical system seen from another point of view according to the present application, it is preferable that, the concave surface on which the antireflection coating is applied as seen from the aperture stop is an object side lens surface. Since the object side concave surface as seen from the aperture stop among optical surfaces in the first lens group through the third lens group tends to generate reflection light, with applying the antireflection coating on such an optical surface, ghost images and flare can effectively be suppressed.

Moreover, in an optical system seen from another point of view according to the present application, the optical surface on which the antireflection coating is applied is preferably a concave surface seen from an object side. Since reflection light rays are liable to be generated on a concave surface seen from the object side among optical surfaces in the first lens group through the third lens group, with applying the antireflection coating on such an optical surface, ghost images and flare can effectively be suppressed.

Moreover, in an optical system seen from another point of view according to the present application, the concave optical surface seen from the object side on which the antireflection coating is applied is preferably an optical surface in the second lens group. Since reflection light rays are liable to be generated on a concave surface seen from the object side in the second lens group, with applying the antireflection coating on such an optical surface, ghost images and flare can effectively be suppressed.

Moreover, in an optical system seen from another point of view according to the present application, the concave optical surface seen from the object on which the antireflection coating is formed is preferably an object side lens surface of the second lens group. Since reflection light rays are liable to be generated on the object side lens surface of the second lens group, which is a concave optical surface seen from the object side, with applying the antireflection coating on such an optical surface, ghost images and flare can effectively be suppressed.

Moreover, in an optical system seen from another point of view according to the present application, the optical surface on which the antireflection coating is applied is preferably a concave surface seen from the image side. Among optical surfaces in the first lens group through the third lens group, since reflection light rays are liable to be generated on the concave surface seen from the image side, with applying the antireflection coating on such an optical surface, ghost images and flare can effectively be suppressed.

Moreover, in an optical system seen from another point of view according to the present application, the concave optical surface seen from the image side on which the antireflection coating is applied is preferably a lens surface in the third lens group. Since reflection light rays are liable to be generated on a concave surface seen from the image side in the third lens group, with applying the antireflection coating on such an optical surface, ghost images and flare can effectively be suppressed.

Moreover, in an optical system seen from another point of view according to the present application, the concave optical surface seen from the image side on which the antireflection coating is applied is preferably an object side lens surface of the third lens group. Since reflection light rays are liable to be generated on the object side lens surface of the third lens group, which is a concave surface seen from the image side, with applying the antireflection coating on such an optical surface, ghost images and flare can effectively be suppressed.

In an optical system seen from another point of view according to the present application, the antireflection coating may also be applied by a dry process etc without being limited to the wet process. On this occasion, it is preferable that the antireflection coating includes at least one layer of which the refractive index is equal to 1.30 or less. With this configuration, the same effects as in the case of using the wet process can be obtained by forming the antireflection coating based on the dry process etc. Note that at this time the layer of which the refractive index is equal to 1.30 or less is preferably the layer of the outermost surface of the layers composing the multi-layered film.

In an optical system seen from another point of view according to the present application, the following conditional expression (4A) is preferably satisfied:

$$0.50 < |fVR|/f3 \leq 1.00 \quad (4A)$$

where fVR denotes a focal length of the at least a portion of the third lens group, and f3 denotes a focal length of the third lens group.

Conditional expression (4A) defines the focal length of the at lease a portion of the third lens group provided movably in a direction including a component perpendicular to the optical axis, which is hereinafter called as a vibration reduction lens group, and the focal length of the third lens group. With satisfying conditional expression (4A), an optical system seen from another point of view according to the present application makes it possible to prevent the optical system from getting large and excellently correct decentering coma upon vibration reduction.

When the ratio $|fVR|/f3$ exceeds the upper limit of conditional expression (4A), refractive power of the vibration reduction lens group in the third lens group becomes small. Accordingly, a moving amount of the vibration reduction lens group upon vibration reduction becomes large, so that an outer diameter of the lens barrel and the outer diameter of the vibration reduction unit become large. Accordingly, it is undesirable. Moreover, when refractive power of the third lens group is made small so that the ratio $|fVR|/f3$ does not exceed the upper limit of conditional expression (4A), the total lens length of the optical system becomes large, so that it is undesirable. In order to secure the effect of the present application, it is desirable to set the upper limit of conditional expression (4A) to 0.90.

On the other hand, when the ratio $|fVR|/f3$ is equal to or falls below the lower limit of conditional expression (4A), refractive power of the vibration reduction lens group becomes large, so that it becomes difficult to correct decentering coma upon vibration reduction. Accordingly, it is undesirable. In order to secure the effect of the present application, it is desirable to set the lower limit of conditional expression (4A) to 0.55.

In an optical system seen from another point of view according to the present application, the following conditional expression (5) is preferably satisfied:

$$0.60 < (-fVR)/fp2 < 1.50 \quad (5)$$

where fVR denotes a focal length of the negative lens group in the third lens group, and fp2 denotes a focal length of the second positive lens group in the third lens group.

Conditional expression (5) defines the focal length of the negative lens group with respect to the focal length of the second positive lens group in the third lens group. However, conditional expression (5) has already been explained above, so that duplicated explanations are omitted.

In an optical system seen from another point of view according to the present application, the first positive lens group in the third lens group is preferably composed of a cemented lens constructed by a positive lens cemented with a negative lens. With this configuration, it becomes possible to make the lens barrel downsized.

In an optical system seen from another point of view according to the present application, the second lens group preferably includes two negative lenses and one positive lens. With this configuration, it becomes possible to suppress variations in aberrations upon focusing.

An optical apparatus seen from another point of view according to the present application is equipped with the above-described optical system. With this configuration, it becomes possible to realize an optical apparatus excellently suppressing variations in aberrations upon vibration reduction.

A method for manufacturing an optical system seen from another point of view according to the present application is a method for manufacturing an optical system including, in order from an object side, a first lens group having positive refractive power, a second lens group having negative refractive power, and a third lens group having positive refractive power, the method comprising steps of:

applying an antireflection coating to at least one optical surface among optical surfaces in the first lens group through the third lens group, and the antireflection coating including at least one layer that is formed by a wet process;

disposing the first lens group, the second lens group and the third lens group with satisfying the following conditional expressions (1) through (3):

$$0.30 < f1/f < 0.60 \quad (1)$$

$$0.10 < (-f2)/f < 0.60 \quad (2)$$

$$0.30 < f3/f < 0.60 \quad (3)$$

where f denotes a focal length of the optical system, f1 denotes a focal length of the first lens group, f2 denotes a focal length of the second lens group, and f3 denotes a focal length of the third lens group;

disposing the second lens group movably upon carrying out focusing from an infinitely distant object to a close object; and disposing at least a portion of the third lens group movably in a direction including a component perpendicular to the optical axis.

With this method for manufacturing an optical system seen from another point of view according to the present application, it becomes possible to manufacture an optical system capable of excellently suppressing ghost images and flare with excellently controlling variations in aberrations upon vibration reduction.

An optical system according to each numerical example of the present application will be explained below with reference to accompanying drawings.

EXAMPLE 1

FIG. 1 is a sectional view showing a lens configuration of an optical system according to Example 1 of the present application.

The optical system according to Example 1 of the present application is composed of, in order from an object side, a first lens group G1 having positive refractive power, a second lens group G2 having negative refractive power, and a third lens group G3 having positive refractive power.

The first lens group G1 is composed of, in order from the object side, a double convex positive lens L11, a positive meniscus lens L12 having a convex surface facing the object side, a cemented lens constructed by a double convex positive lens L13 cemented with a double concave negative lens L14, and a cemented lens constructed by a negative meniscus lens L15 having a convex surface facing the object side cemented with a double convex positive lens L16.

The second lens group G2 is composed of, in order from the object side, a double concave negative lens L21, and a cemented lens constructed by a double convex positive lens L22 cemented with a double concave negative lens L23.

The third lens group G3 is composed of, in order from the object side, an aperture stop S, a first positive lens group Gp1 having positive refractive power, a negative lens group GVR having negative refractive power, and a second positive lens group Gp2 having positive refractive power.

The first positive lens group Gp1 is composed of a cemented lens alone constructed by, in order from the object side, negative meniscus lens L31 having a convex surface facing the object side cemented with a double convex positive lens L32.

The negative lens group GVR is composed of a cemented lens alone constructed by, in order from the object side, a positive meniscus lens L33 having a convex surface facing the image side cemented with a double concave negative lens L34.

The second positive lens group Gp2 is composed of a cemented lens alone constructed by, in order from the object side, a double convex positive lens L35 cemented with a negative meniscus lens L36 having a convex surface facing the image side.

In the optical system according to Example 1, the whole of the second lens group G2 is moved to the image side, thereby carrying out focusing from an infinitely distant object to a close object.

In the optical system according to Example 1, the negative lens group GVR in the third lens group is moved as a vibration reduction lens group in a direction including a component perpendicular to the optical axis, thereby correcting an image blur.

In the optical system seen from another point of view according to Example 1, an antireflection coating explained later is applied to an object side lens surface (surface number 5) of the positive lens L13 in the first lens group G1 and an image side lens surface (surface number 19) of the positive lens L32 in the third lens group G3.

Various values associated with the optical system according to Example 1 are listed in Table 1.

In (Specifications), f denotes a focal length of the optical system, FNO denotes an f-number, 2ω denotes an angle of view, Y denotes an image height, TL denotes a total lens length, and BF denotes a back focal length.

In (Lens Surface Data), the left most column "i" shows optical surface number, the second column "r" shows a radius of curvature of each optical surface, the third column "d" shows a surface distance, the fourth column "nd" shows a refractive index at d-line (wavelength λ=587.6 nm), and the fifth column "vd" shows an Abbe number at d-line (wavelength λ=587.6 nm). In the fifth column "nd", refractive index of the air nd=1.000000 is omitted. In the second column "r", r=∞ indicates a plane surface. In the first column "i", "OP" denotes an object plane, and "I" denotes an image plane. In (Lens Group Data), a start surface number "ST" and a focal length of each lens group are shown. In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in Examples 2 and 3.

In an optical system having a focal length of f, and a vibration reduction coefficient (a ratio of a moving amount of an image on the image plane I to a moving amount of the vibration reduction lens group upon vibration reduction) of K, in order to correct rotational camera shake of θ, the vibration reduction lens group is to be moved by an amount of (f·tan θ)/K in a direction perpendicular to the optical axis. Accordingly, in the optical system according to Example 1 of the present application, the vibration reduction coefficient K is 0.80 and the focal length is 132.9 mm, so that in order to correct rotational camera shake of 0.3 degrees, the moving amount of the vibration reduction lens group becomes 0.87 mm.

TABLE 1

(Specifications)

f = 132.9
FNO = 1.8
2ω = 18.3
Y = 21.6
TL = 162.5
Bf = 42.2

TABLE 1-continued (Lens Surface Data)

| i | r | d | nd | νd |
|---|---|---|---|---|
| OP | ∞ | ∞ | | |
| 1 | 218.5583 | 7.000 | 1.618000 | 63.37 |
| 2 | −540.2614 | 0.200 | | |
| 3 | 103.9713 | 7.000 | 1.618000 | 63.37 |
| 4 | 438.0518 | 0.200 | | |
| 5 | 70.4602 | 12.000 | 1.497820 | 82.51 |
| 6 | −296.9672 | 3.000 | 1.834807 | 42.72 |
| 7 | 138.0366 | 9.005 | | |
| 8 | 62.1858 | 2.500 | 1.800999 | 34.96 |
| 9 | 38.2633 | 12.000 | 1.497820 | 82.51 |
| 10 | −456.2726 | 3.000 | | |
| 11 | −496.4748 | 2.500 | 1.583130 | 59.39 |
| 12 | 45.5419 | 4.281 | | |
| 13 | 357.5640 | 4.000 | 1.846660 | 23.78 |
| 14 | −110.4606 | 2.000 | 1.658441 | 50.89 |
| 15 | 46.8715 | 15.123 | | |
| 16 | ∞ | 2.000 | Aperture Stop S | |
| 17 | 173.9463 | 2.000 | 1.728250 | 28.46 |
| 18 | 35.3526 | 7.500 | 1.834807 | 42.72 |
| 19 | −111.2682 | 2.000 | | |
| 20 | −166.6361 | 4.000 | 1.846660 | 23.78 |
| 21 | −42.0037 | 1.500 | 1.667551 | 41.96 |
| 22 | 44.0612 | 7.964 | | |
| 23 | 55.3579 | 7.500 | 1.834807 | 42.72 |
| 24 | −50.6631 | 2.000 | 1.846660 | 23.78 |
| 25 | −1557.1808 | BF | | |
| I | ∞ | | | |

(Lens Group Data)

| Group | ST | Focal Length |
|---|---|---|
| 1 | 1 | 72.618 |
| 2 | 11 | −39.896 |
| 3 | 16 | 72.553 |
| p1 | 17 | 69.290 |
| VR | 20 | −62.121 |
| p2 | 23 | 65.095 |

(Values for Conditional Expressions)

(1) f1/f = 0.55
(2) (−f2)/f = 0.30
(3) f3/f = 0.55
(4) (−fVR)/f3 = 0.86
(4A) |fVR|/f3 = 0.86
(5) (−fVR)/fp2 = 0.95

Figure 2A:
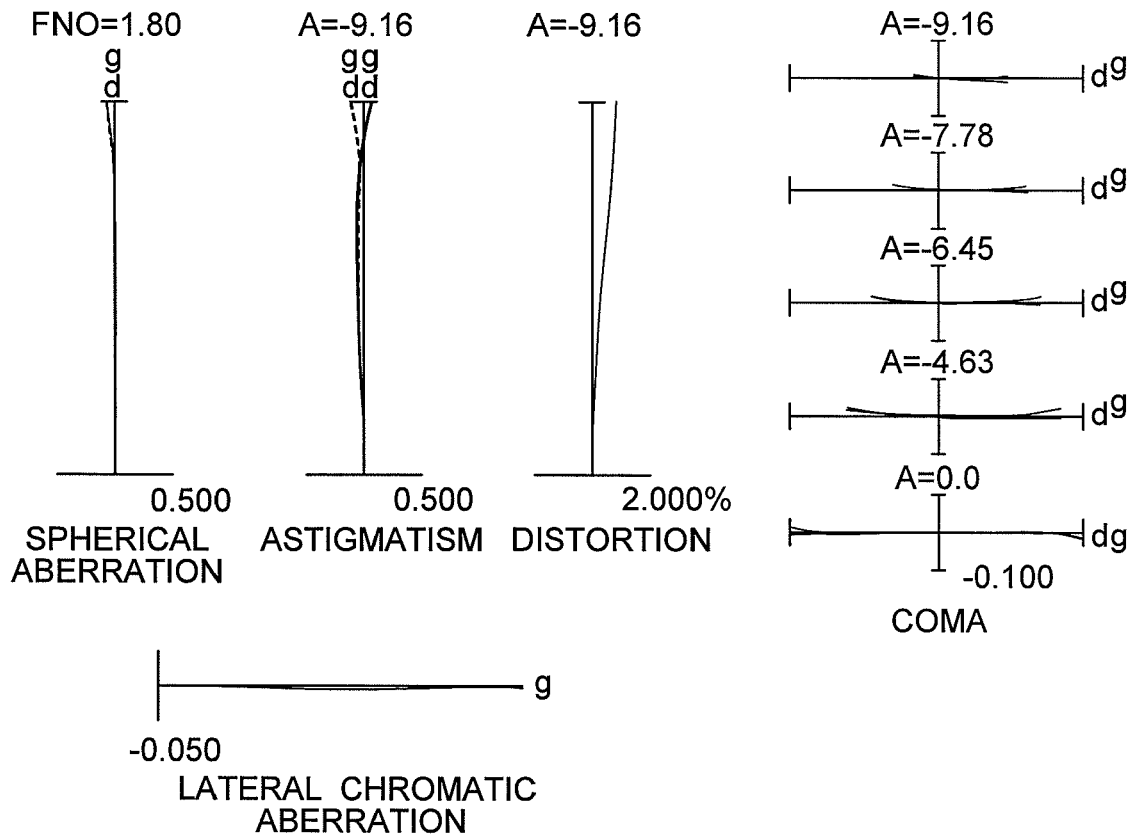
Figure 2B:
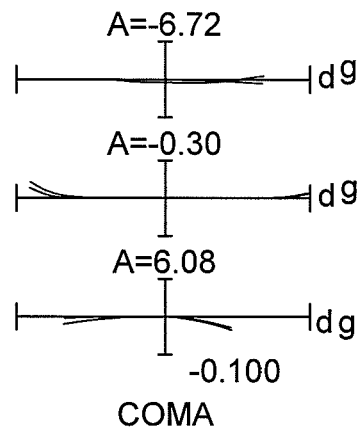

FIGS. 2A and 2B are graphs showing aberrations of the optical system according to Example 1 upon focusing on an infinitely distant object, in which FIG. 2A shows various aberrations, and FIG. 2B shows coma upon carrying out vibration reduction with respect to rotational camera shake of 0.3 degrees.

In FIGS. 2A and 2B, FNO denotes an f-number, and A denotes a half angle of view. In graphs showing spherical aberration, the f-number with respect to the maximum aperture is shown. In graphs showing astigmatism and distortion, the maximum value of a half angle of view is shown. In graphs showing coma, each value of a half angle of view is shown. "d" denotes d-line (587.6 nm), and "g" denotes g-line (435.8 nm). In graphs showing astigmatism, a solid line indicates a sagittal image plane, and a broken line indicates a meridional image plane. The explanations of reference symbols are the same in the other Examples 2 and 3.

As is apparent from various graphs, the optical system according to Example 1 of the present application shows superb optical performance as a result of good corrections to various aberrations, even upon vibration reduction.

FIG. 3 is a sectional view showing the lens configuration of the optical system seen from another point of view according to Example 1 of the present application and is an explanatory view, in which light rays reflected from a first-ghost-generating surface are reflected by a second-ghost-generating surface.

As shown in FIG. 3, when light rays BM from an object are incident on the optical system, a portion of the rays BM are reflected by the image side lens surface (a first-ghost-generating surface whose surface number is 19) of the positive lens L32 in the third lens group G3, and the reflected light rays are reflected again by the image side lens surface (a second-ghost-generating surface whose surface number is 5) of the positive lens L13 to reach the image plane I with generating ghost images. Incidentally, the first-ghost-generating surface 19 is a concave surface seen from the aperture stop S, and the second-ghost-generating surface 5 is a concave surface seen from the aperture stop S. With applying an antireflection coating corresponding to a broad wavelength range explained later to such lens surfaces, it becomes possible to effectively suppress ghost images and flare.

EXAMPLE 2

FIG. 4 is a sectional view showing a lens configuration of an optical system according to Example 2 of the present application.

The optical system according to Example 2 of the present application is composed of, in order from an object side, a first lens group G1 having positive refractive power, a second lens group G2 having negative refractive power, and a third lens group G3 having positive refractive power.

The first lens group G1 is composed of, in order from the object side, a double convex positive lens L11, a positive meniscus lens L12 having a convex surface facing the object side, a cemented lens constructed by a double convex positive lens L13 cemented with a double concave negative lens L14, and a cemented lens constructed by a negative meniscus lens L15 having a convex surface facing the object side cemented with a double convex positive lens L16.

The second lens group G2 is composed of, in order from the object side, a double concave negative lens L21, and a cemented lens constructed by a positive meniscus lens L22 having a convex surface facing the image side cemented with a double concave negative lens L23.

The third lens group G3 is composed of, in order from the object side, an aperture stop S, a first positive lens group Gp1 having positive refractive power, a negative lens group GVR having negative refractive power, and a second positive lens group Gp2 having positive refractive power.

The first positive lens group Gp1 is composed of a cemented lens alone constructed by, in order from the object side, negative meniscus lens L31 having a convex surface facing the object side cemented with a double convex positive lens L32.

The negative lens group GVR is composed of a cemented lens alone constructed by, in order from the object side, a positive meniscus lens L33 having a convex surface facing the image side cemented with a double concave negative lens L34.

The second positive lens group Gp2 is composed of a cemented lens alone constructed by, in order from the object side, a double convex positive lens L35 cemented with a double concave negative lens L36.

In the optical system according to Example 2, the whole of the second lens group G2 is moved to the image side, thereby carrying out focusing from an infinitely distant object to a close object.

In the optical system according to Example 2, the negative lens group GVR in the third lens group is moved as a vibration reduction lens group in a direction including a component perpendicular to the optical axis, thereby correcting an image blur.

In the optical system seen from another point of view according to Example 2, an antireflection coating explained later is applied to an object side lens surface (surface number 5) of the positive lens L13 in the first lens group G1, an object side lens surface (surface number 13) of the positive meniscus lens L22 in the second lens group G2, and an object side lens surface (surface number 20) of the positive meniscus lens L33 in the third lens group G3.

Various values associated with the optical system according to Example 2 are listed in Table 2.

In the optical system according to Example 2 of the present application, the vibration reduction coefficient K is 0.80 and the focal length is 132.2 mm, so that in order to correct rotational camera shake of 0.3 degrees, the moving amount of the vibration reduction lens group becomes 0.87 mm.

TABLE 2

(Specifications)

f = 132.3
FNO = 1.8
2ω = 18.4
Y = 21.6
TL = 162.5
Bf = 41.8

(Lens Surface Data)

| i | r | d | nd | vd |
|---|---|---|---|---|
| OP | ∞ | ∞ | | |
| 1 | 187.7777 | 7.000 | 1.618000 | 63.37 |
| 2 | −496.3475 | 0.200 | | |
| 3 | 103.0350 | 7.000 | 1.618000 | 63.37 |
| 4 | 361.8571 | 0.200 | | |
| 5 | 73.1998 | 12.000 | 1.497820 | 82.51 |
| 6 | −276.4051 | 3.000 | 1.834807 | 42.72 |
| 7 | 139.3412 | 8.016 | | |
| 8 | 82.0080 | 2.500 | 1.603420 | 38.01 |
| 9 | 36.2666 | 12.000 | 1.497820 | 82.51 |
| 10 | −432.9076 | 3.000 | | |
| 11 | −322.8976 | 2.500 | 1.579570 | 53.71 |
| 12 | 46.9288 | 5.140 | | |
| 13 | −1251.6819 | 4.000 | 1.846660 | 23.78 |
| 14 | −88.6342 | 2.000 | 1.516800 | 64.11 |
| 15 | 46.3513 | 15.826 | | |
| 16 | ∞ | 2.000 | Aperture Stop S | |
| 17 | 100.2261 | 2.000 | 1.672700 | 32.11 |
| 18 | 35.6468 | 7.500 | 1.729157 | 54.66 |
| 19 | −100.6435 | 2.000 | | |
| 20 | −149.0360 | 4.000 | 1.846660 | 23.78 |
| 21 | −46.1845 | 1.500 | 1.623740 | 47.05 |
| 22 | 41.7440 | 8.298 | | |
| 23 | 51.6961 | 7.000 | 1.729157 | 54.66 |
| 24 | −53.1754 | 2.000 | 1.728250 | 28.46 |
| 25 | 3202.3299 | BF | | |
| I | ∞ | | | |

(Lens Group Data)

| Group | ST | Focal Length |
|---|---|---|
| 1 | 1 | 74.678 |
| 2 | 11 | −42.925 |
| 3 | 16 | 75.297 |
| p1 | 17 | 65.749 |
| VR | 20 | −62.768 |
| p2 | 23 | 71.890 |

TABLE 2-continued (Values for Conditional Expressions)

(1) f1/f = 0.56
(2) (−f2)/f = 0.32
(3) f3/f = 0.57
(4) (−fVR)/f3 = 0.83
(4A) |fVR|/f3 = 0.83
(5) (−fVR)/fp2 = 0.87

Figure 5A:
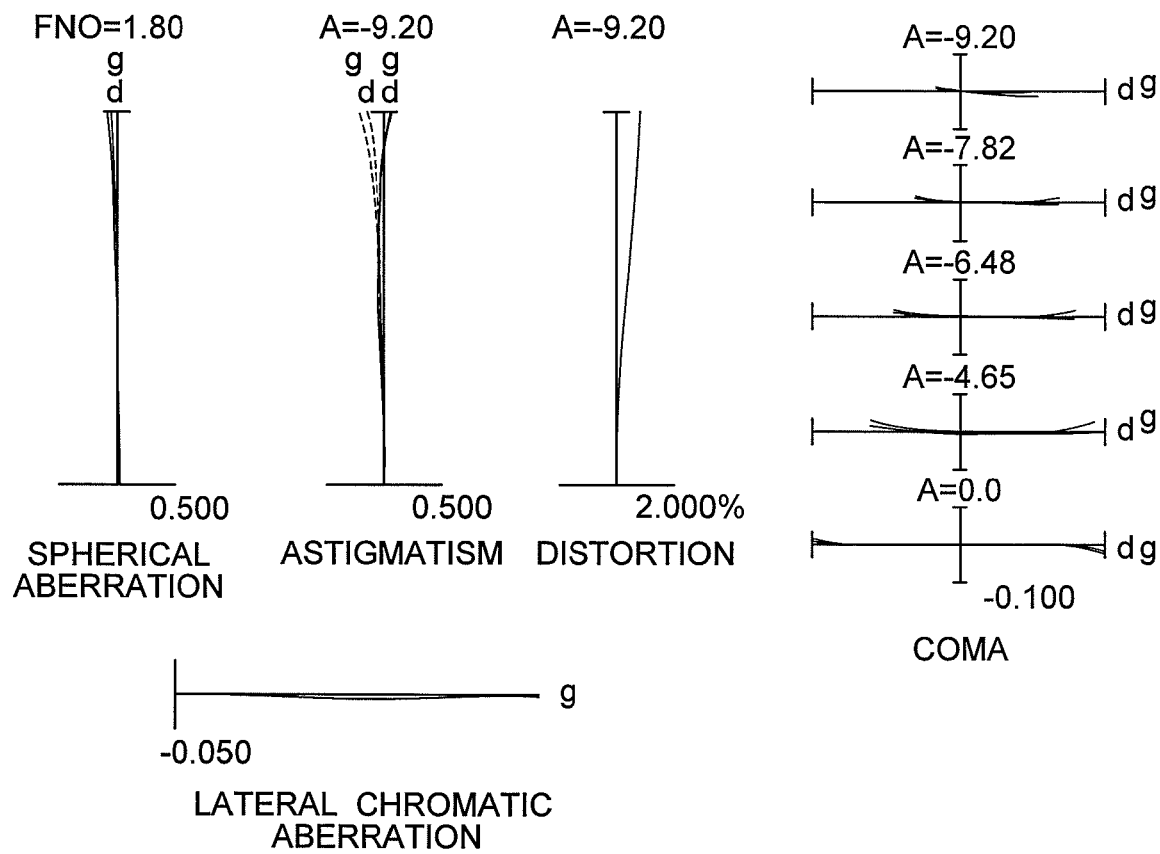
Figure 5B:
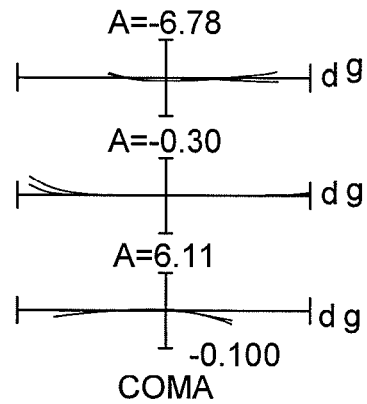

FIGS. 5A and 5B are graphs showing aberrations of the optical system according to Example 2 upon focusing on an infinitely distant object, in which FIG. 5A shows various aberrations, and FIG. 5B shows coma upon carrying out vibration reduction with respect to rotational camera shake of 0.3 degrees.

As is apparent from various graphs, the optical system according to Example 2 of the present application shows superb optical performance as a result of good corrections to various aberrations, even upon vibration reduction.

EXAMPLE 3

Figure 6:
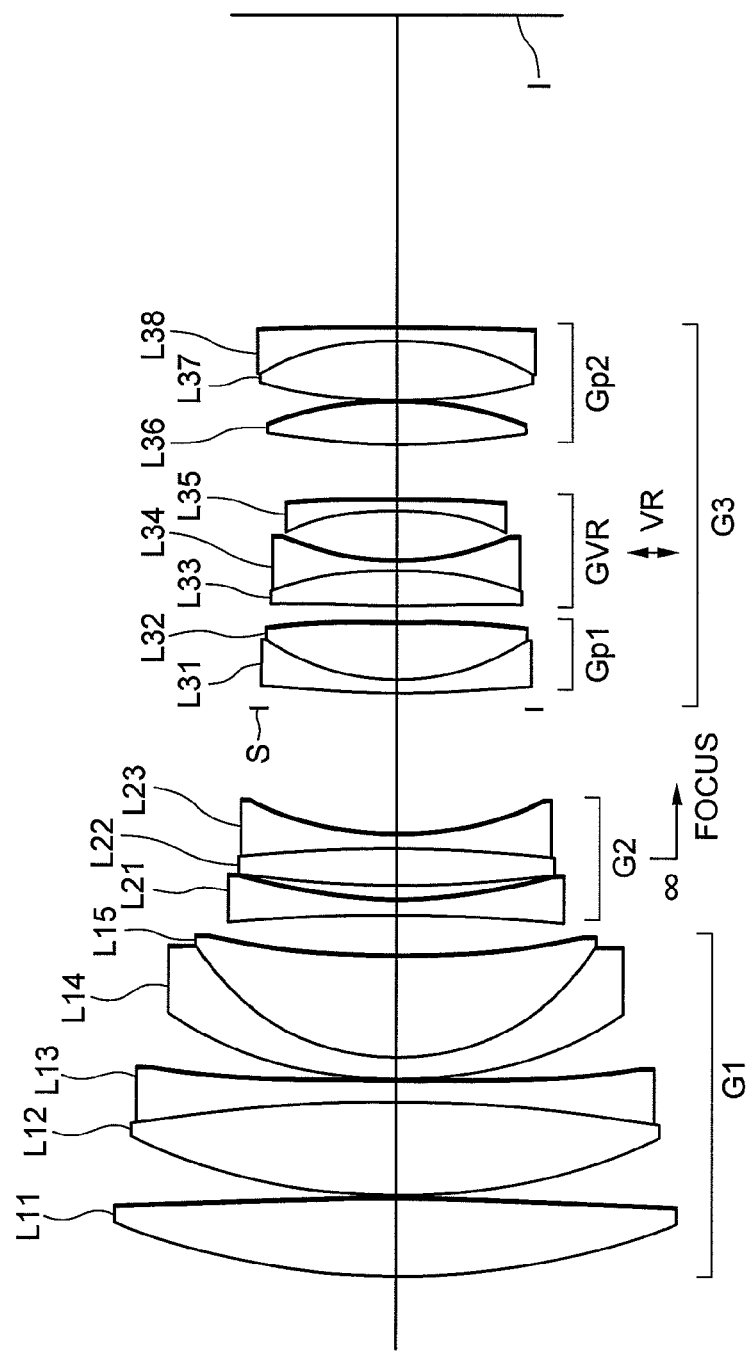
FIG. 6 is a sectional view showing a lens configuration of an optical system according to Example 3 of the present application.

FIG. 6 is a sectional view showing a lens configuration of an optical system according to Example 3 of the present application.

The optical system according to Example 3 of the present application is composed of, in order from an object side, a first lens group G1 having positive refractive power, a second lens group G2 having negative refractive power, and a third lens group G3 having positive refractive power.

The first lens group G1 is composed of, in order from the object side, a double convex positive lens L11, a cemented lens constructed by a double convex positive lens L12 cemented with a double concave negative lens L13, and a cemented lens constructed by a negative meniscus lens L14 having a convex surface facing the object side cemented with a positive meniscus lens L15 having a convex surface facing the object side.

The second lens group G2 is composed of, in order from the object side, a double concave negative lens L21, and a cemented lens constructed by a double convex positive lens L22 cemented with a double concave negative lens L23.

The third lens group G3 is composed of, in order from the object side, an aperture stop S, a first positive lens group Gp1 having positive refractive power, a negative lens group GVR having negative refractive power, and a second positive lens group Gp2 having positive refractive power.

The first positive lens group Gp1 is composed of a cemented lens alone constructed by, in order from the object side, a negative meniscus lens L31 having a convex surface facing the object side cemented with a double convex positive lens L32.

The negative lens group GVR is composed of, in order from the object side, a cemented lens constructed by a double convex positive lens L33 cemented with a double concave negative lens L34, and a negative meniscus lens L35 having a convex surface facing the image side.

The second positive lens group Gp2 is composed of, in order from the object side, a double convex positive lens L36, and a cemented lens constructed by a double convex positive lens L37 cemented with a negative meniscus lens L36 having a convex surface facing the image side.

In the optical system according to Example 3, the whole of the second lens group G2 is moved to the image side, thereby carrying out focusing from an infinitely distant object to a close object.

In the optical system according to Example 3, the negative lens group GVR in the third lens group is moved as a vibration reduction lens group in a direction including a component perpendicular to the optical axis, thereby correcting an image blur.

In the optical system seen from another point of view according to Example 3, an antireflection coating explained later is applied to an object side lens surface (surface number 11) of the double convex positive lens L22 in the second lens group G2, an object side lens surface (surface number 15) of the negative meniscus lens L31 in the third lens group G3, and an image side lens surface (surface number 17) of the double convex positive lens L32 in the third lens group G3.

Various values associated with the optical system according to Example 3 are listed in Table 3.

In the optical system according to Example 3 of the present application, the vibration reduction coefficient K is 0.92 and the focal length is 132.3 mm, so that in order to correct rotational camera shake of 0.3 degrees, the moving amount of the vibration reduction lens group becomes 0.75 mm.

TABLE 3

(Specifications)

f = 132.3
FNO = 1.8
2ω = 18.4
Y = 21.6
TL = 172.5
Bf = 42.4

(Lens Surface Data)

| i | r | d | nd | νd |
|---|---|---|---|---|
| OP | ∞ | ∞ | | |
| 1 | 99.8339 | 11.000 | 1.603001 | 65.46 |
| 2 | −592.6523 | 0.200 | | |
| 3 | 84.1919 | 13.000 | 1.497820 | 82.51 |
| 4 | −203.6824 | 3.000 | 1.672700 | 32.11 |
| 5 | 331.1476 | 0.200 | | |
| 6 | 59.7075 | 3.000 | 1.834807 | 42.72 |
| 7 | 32.0183 | 14.000 | 1.618000 | 63.37 |
| 8 | 129.9551 | 5.190 | | |
| 9 | −417.2325 | 2.500 | 1.804000 | 46.57 |
| 10 | 74.2498 | 1.659 | | |
| 11 | 141.2688 | 5.000 | 1.846660 | 23.78 |
| 12 | −201.1402 | 2.000 | 1.603001 | 65.46 |
| 13 | 42.5251 | 17.021 | | |
| 14 | ∞ | 2.000 | Aperture Stop S | |
| 15 | 156.9902 | 1.800 | 1.903660 | 31.27 |
| 16 | 30.0000 | 8.000 | 1.816000 | 46.62 |
| 17 | −234.0935 | 2.000 | | |
| 18 | 403.6661 | 5.000 | 2.000690 | 25.45 |
| 19 | −56.0817 | 1.500 | 1.548141 | 45.79 |
| 20 | 34.7886 | 6.892 | | |
| 21 | −37.1080 | 1.500 | 1.548141 | 45.79 |
| 22 | −545.2217 | 7.499 | | |
| 23 | 97.2472 | 6.000 | 1.603001 | 65.46 |
| 24 | −48.6236 | 0.100 | | |
| 25 | 74.0949 | 8.000 | 1.497820 | 82.51 |
| 26 | −40.5063 | 2.000 | 1.612930 | 36.96 |
| 27 | −788.8992 | BF | | |
| I | ∞ | | | |

(Lens Group Data)

| Group | ST | Focal Length |
|---|---|---|
| 1 | 1 | 74.741 |
| 2 | 9 | −49.371 |
| 3 | 14 | 76.734 |
| p1 | 15 | 159.420 |
| VR | 18 | −52.643 |
| p2 | 23 | 43.282 |

TABLE 3-continued (Values for Conditional Expressions)

(1) f1/f = 0.57
(2) (−f2)/f = 0.37
(3) f3/f = 0.58
(4) (−fVR)/f3 = 0.69
(4A) |fVR|/f3 = 0.69
(5) (−fVR)/fp2 = 1.22

Figure 7A:
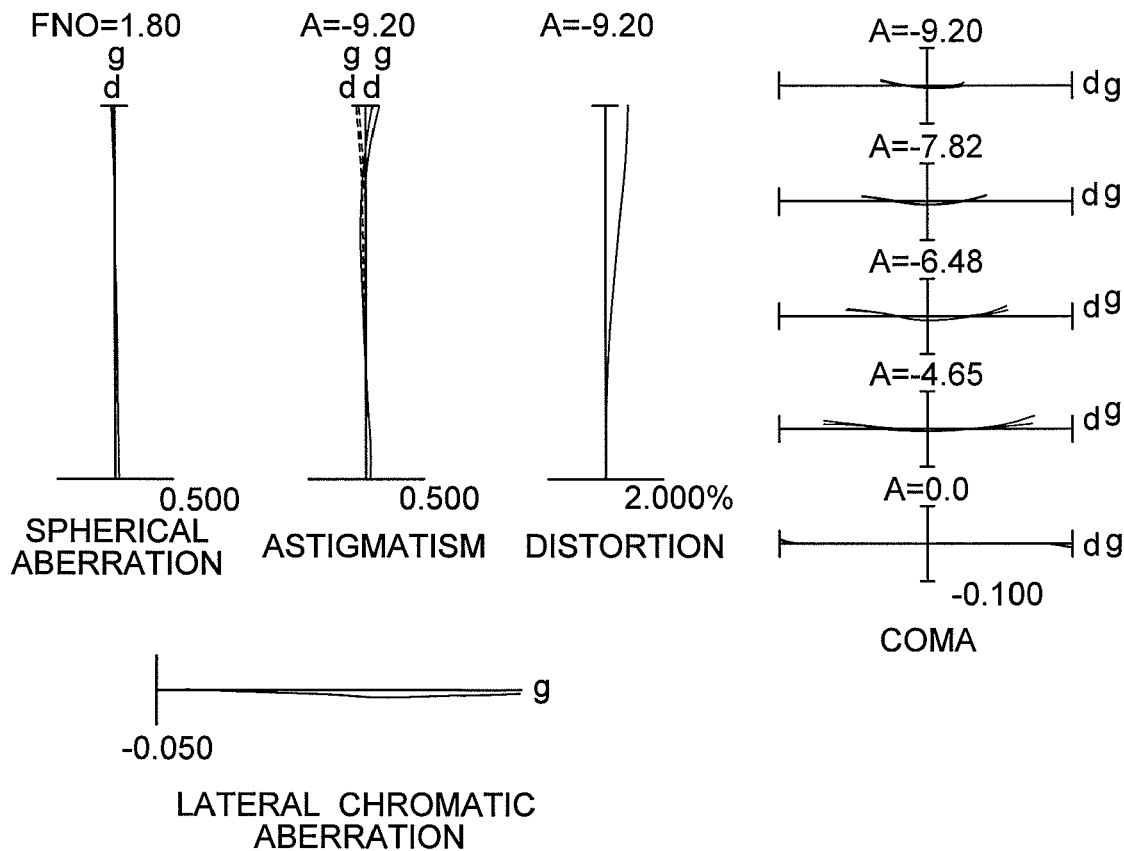
Figure 7B:
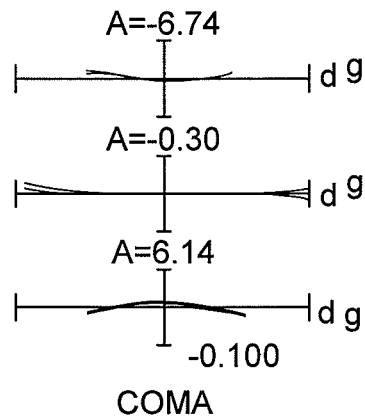

FIGS. 7A and 7B are graphs showing aberrations of the optical system according to Example 3 upon focusing on an infinitely distant object, in which FIG. 7A shows various aberrations, and FIG. 7B shows coma upon carrying out vibration reduction with respect to rotational camera shake of 0.3 degrees.

As is apparent from various graphs, the optical system according to Example 3 of the present application shows superb optical performance as a result of good corrections to various aberrations, even upon vibration reduction.

Then, an antireflection coating, which is also referred to as a multi-layered broadband antireflection coating, used in an optical system seen from another point of view according to the present application is explained.

Figure 11:
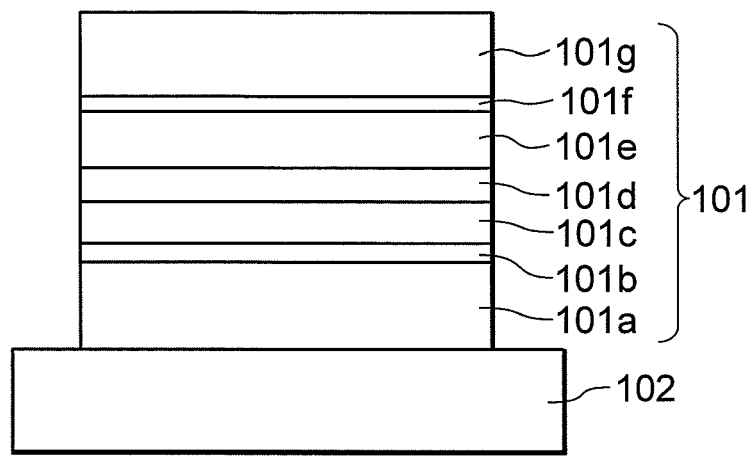
FIG. 11 is an explanatory view showing a configuration of an antireflection coating according to the present application.

FIG. 11 is an explanatory view showing a configuration of an antireflection coating used in an optical system seen from another point of view according to the present application. As shown in FIG. 11, the antireflection coating 101 is composed of seven layers and is formed on an optical surface of an optical member 102 such as a lens.

A first layer 101a is formed with aluminum oxide by means of a vacuum evaporation method.

On the first layer 101a, a second layer 101b formed with mixture of titanium oxide and zirconium oxide by means of a vacuum evaporation method is formed.

Moreover, on the second layer 101b, a third layer 101c formed with aluminum oxide by means of vacuum evaporation method is formed.

Moreover, on the third layer 101c, a fourth layer 101d formed with a mixture of titanium oxide and zirconium oxide by means of a vacuum evaporation method is formed.

Furthermore, on the fourth layer 101d, a fifth layer 101e formed with aluminum oxide by means of vacuum evaporation method is formed.

On the fifth layer 101e, a sixth layer 101f formed with mixture of titanium oxide and zirconium oxide by means of a vacuum evaporation method is formed.

Then, on the sixth layer 101f formed in this manner, a seventh layer 101g formed with a mixture of silica and magnesium fluoride is formed by means of a wet process to form the antireflection coating according to the present embodiment. In order to form the seventh layer 101g, a sol-gel process, which is a kind of wet process, is used. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Note that the wet process may involve using, without being limited to the sol-gel process, a process of acquiring a solid-state film through none of the gel state.

In this manner, the first layer 101a through the sixth layer 101f are formed by electron beam evaporation, which is a dry process, and the seventh layer 101g, which is the uppermost layer, is formed by a following wet-process using sol liquid prepared by a hydrofluoric acid/magnesium acetate method. Incidentally, the first layer 101a through the seventh layer 101g are formed in detail by the following procedures.

At first, an aluminum oxide layer, which becomes a first layer 101a, a mixture of titanium oxide and zirconium oxide layer, which becomes a second layer 101b, an aluminum oxide layer, which becomes a third layer 101c, a mixture of titanium oxide and zirconium oxide layer, which becomes a fourth layer 101d, an aluminum oxide layer, which becomes a fifth layer 101e, and a mixture of titanium oxide and zirconium oxide layer, which becomes a sixth layer 101f are formed on a film-forming surface (the above-mentioned optical surface of the optical member 102) in this order by a vacuum evaporation equipment.

Then, the optical member 102 is applied with a sol liquid prepared by the hydrofluoric acid/magnesium acetate method added by silicone alkoxide by means of a spin coat method, so that a layer formed by a mixture of silica and magnesium fluoride, which becomes a seventh layer 101g, is formed. A reaction formula prepared by the hydrofluoric acid/magnesium acetate method is shown by expression (a):

$$2HF + Mg(CH_3COO)_2 \rightarrow MgF_2 + 2CH_3COOH \quad (a).$$

The sol liquid is used for forming the film after mixing ingredients with undergoing high temperature, high pressure maturing process at 140° C., 24 hours by means of an autoclave. After completion of forming the seventh layer 101g, the optical member 102 is processed with heating treatment at 160° C. in atmospheric pressure for 1 hour to be completed. With the use of the sol-gel process, particles on the order of several nanometers (nm) to several dozens nanometers (nm) in particle size are deposited while the air gaps remain, thereby forming the seventh layer 101g.

Optical performance of the optical member including the thus-formed antireflection coating 101 will hereinafter be described by using spectral characteristics shown in FIG. 12.

The optical member (lens) including the antireflection coating according to the present application is formed under the conditions shown in the following Table 4. Herein, the Table 4 shows respective optical film thicknesses of the layers 101a (the first layer) through 101g (the seventh layer) of the antireflection coating 101, which are obtained under such conditions that λ denotes a reference wavelength and the refractive index of the substrate (optical member) is set to 1.62, 1.74 and 1.85. Note that the Table 4 shows Al2O3 expressed as the aluminum oxide, ZrO2+TiO2 expressed as the mixture of titanium oxide and zirconium oxide and MgF2+SiO2 expressed as the mixture of magnesium fluoride and silica.

TABLE 4

| layer | material | n | thicknesses of layers | | |
|---|---|---|---|---|---|
| | medium air | 1 | | | |
| 7 | MgF2 + SiO2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| | n (substrate) | | 1.62 | 1.74 | 1.85 |

Figure 12:
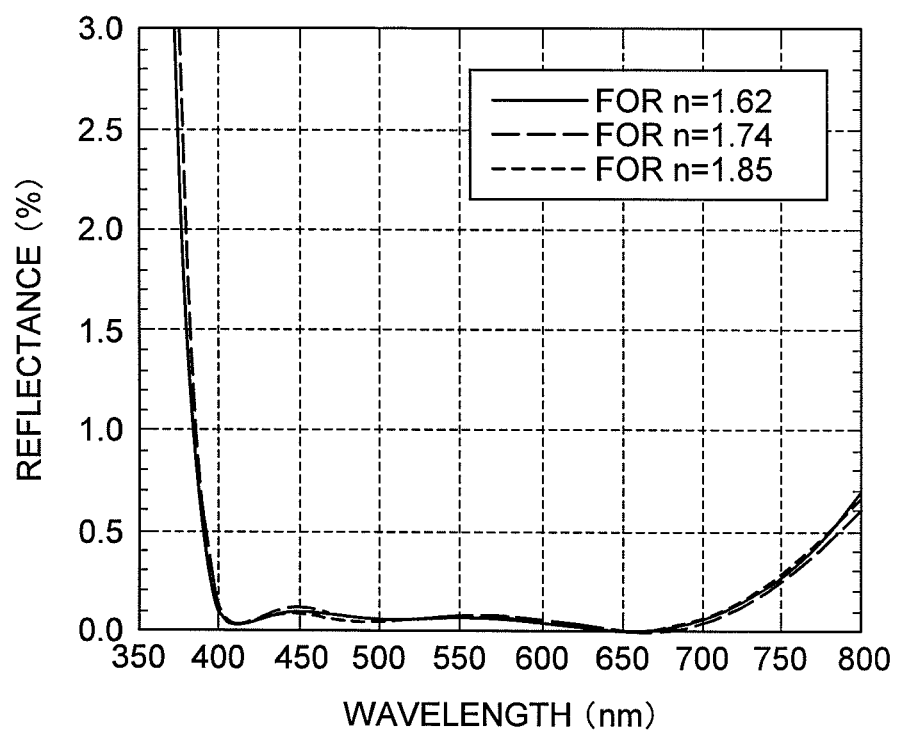
FIG. 12 is a graph showing spectral reflectance of an antireflection coating according to the present embodiment.

FIG. 12 shows the spectral characteristics when the light beams are vertically incident on the optical member in which the optical film thickness of each of the layers of the antireflection coating 101 is designed, with the reference wavelength λ set to 550 nm in Table 4.

It is understood from FIG. 12 that the optical member including the antireflection coating 101 designed with the reference wavelength λ set to 550 nm can restrain the reflectance down to 0.2% or less over the entire range in which the wavelengths of the light beams are 420 nm through 720 nm. Further, in the Table 4, even the optical member including the antireflection coating 101, in which each optical film thickness is designed with the reference wavelength λ set to the d-line (wavelength 587.6 nm), has substantially the same spectral characteristics as in the case where the reference wavelength λ shown in FIG. 12 is 550 nm in a way that affects substantially none of the spectral characteristics thereof.

Next, a modified example of the antireflection coating will be explained. The antireflection coating is a 5-layered film, and, similarly to the Table 4, the optical film thickness of each layer with respect to the reference wavelength λ is designed under conditions shown in the following Table 5. In this modified example, the formation of the fifth layer involves using the sol-gel process described above.

TABLE 5

| layer | material | n | thicknesses of layers | |
|---|---|---|---|---|
| | medium air | 1 | | |
| 5 | MgF2 + SiO2 | 1.26 | 0.275λ | 0.269λ |
| 4 | ZrO2 + TiO2 | 2.12 | 0.045λ | 0.043λ |
| 3 | Al2O3 | 1.65 | 0.212λ | 0.217λ |
| 2 | ZrO2 + TiO2 | 2.12 | 0.077λ | 0.066λ |
| 1 | Al2O3 | 1.65 | 0.288λ | 0.290λ |
| | n (substrate) | | 1.46 | 1.52 |

Figure 13:
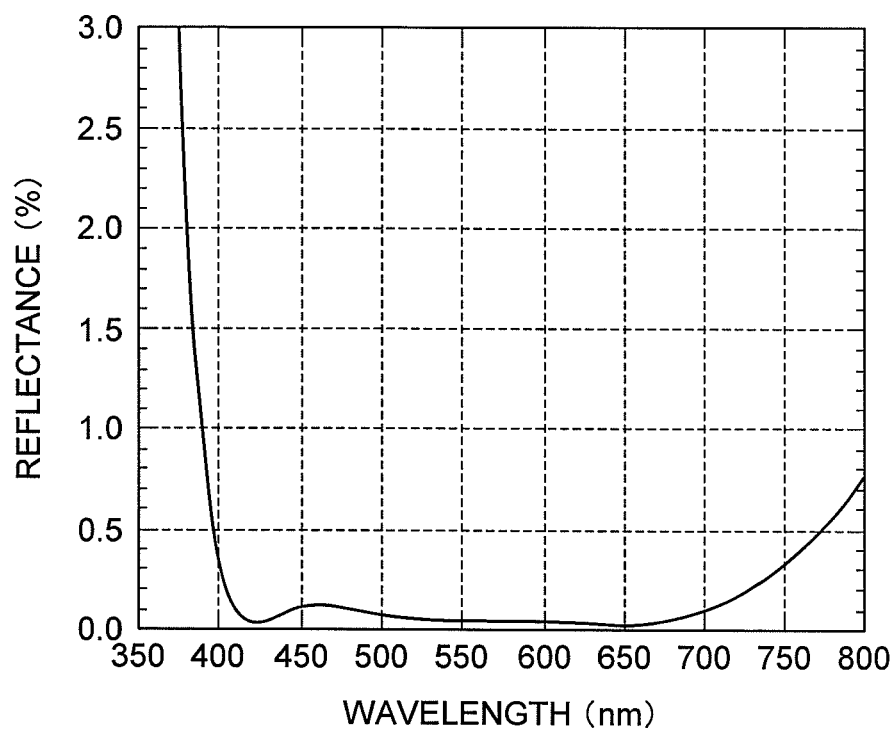
FIG. 13 is a graph showing spectral reflectance of an antireflection coating according to a variation of the present application.

FIG. 13 shows the spectral characteristics when the light beams are vertically incident on the optical member in which the optical film thickness of each of the layers is designed, with the substrate refractive index set to 1.52 and the reference wavelength λ set to 550 nm in the Table 5.

It is understood from FIG. 13 that the antireflection coating in the modified example can restrain the reflectance down to 0.2% or less over the entire range in which the wavelengths of the light beams are from 420 nm to 720 nm. Note that in the Table 5, even the optical member including the antireflection coating, in which each optical film thickness is designed with the reference wavelength λ set to the d-line (wavelength 587.6 nm), has substantially the same spectral characteristics as the spectral characteristics shown in FIG. 13 in a way that affects substantially none of the spectral characteristics thereof.

Figure 14:
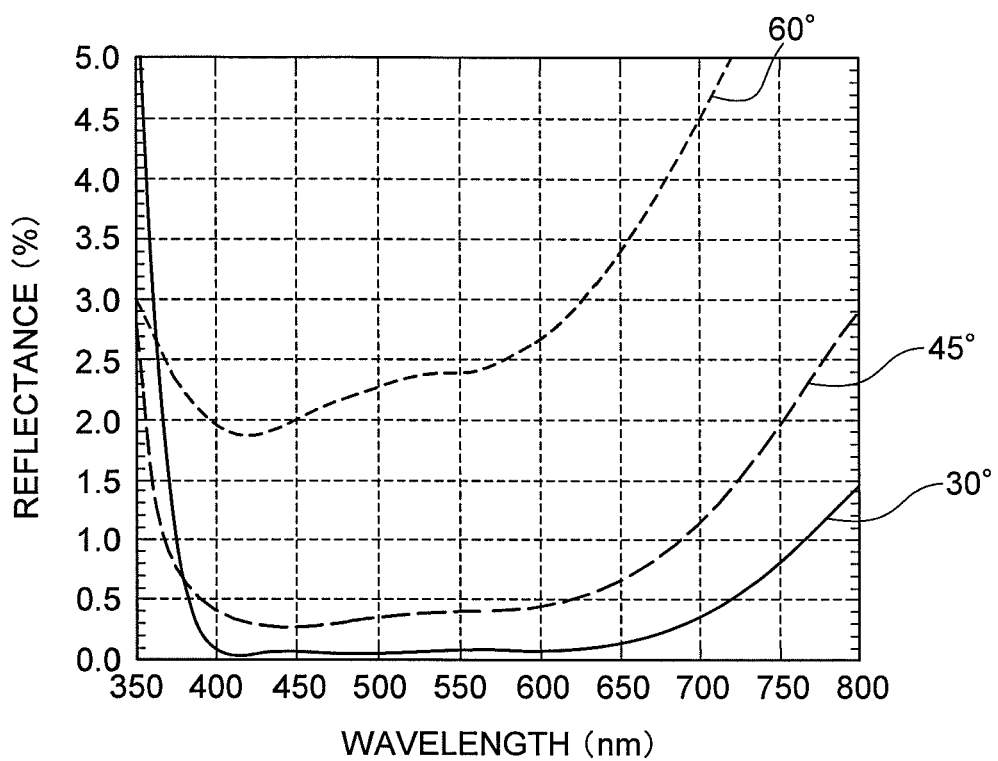
FIG. 14 is a graph showing incident angle dependency of spectral reflectance of the antireflection coating according to the variation.

FIG. 14 shows the spectral characteristics in such a case that the incident angles of the light beams upon the optical member having the spectral characteristics shown in FIG. 13 are 30 degrees, 45 degrees and 60 degrees, respectively. Note that FIGS. 13 and 14 do not illustrate the spectral characteristics of the optical member including the antireflection coating in which the substrate refractive index is 1.46 shown in Table 5, however, it is understood that the optical member has substantially the same spectral characteristics such as the substrate refractive index being 1.52.

Figure 15:
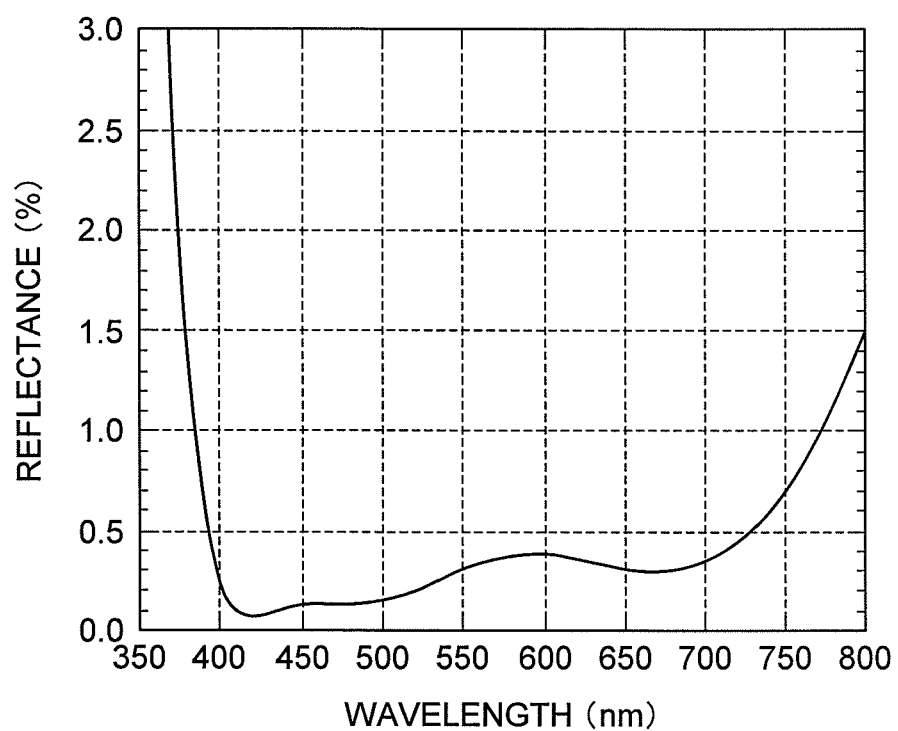
FIG. 15 is a graph showing spectral reflectance of an antireflection coating according to a conventional example.

Furthermore, FIG. 15 shows one example of the antireflection coating grown by only the dry process such as the conventional vacuum evaporation method by way of a comparison. FIG. 15 shows the spectral characteristics when the light beams are vertically incident on the optical member in which the antireflection coating is structured under the conditions shown in the following Table 6, with the substrate refractive index set to 1.52 in the same way as in the Table 5. Moreover, FIG. 16 shows the spectral characteristics in such a case that the incident angles of the light beams upon the optical member having the spectral characteristics shown in FIG. 15 are 30 degrees, 45 degrees and 60 degrees, respectively.

TABLE 6

| layer | material | n | thicknesses of layers |
|---|---|---|---|
|  | medium air | 1 |  |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
|  | refractive index of substrate |  | 1.52 |

Figure 16:
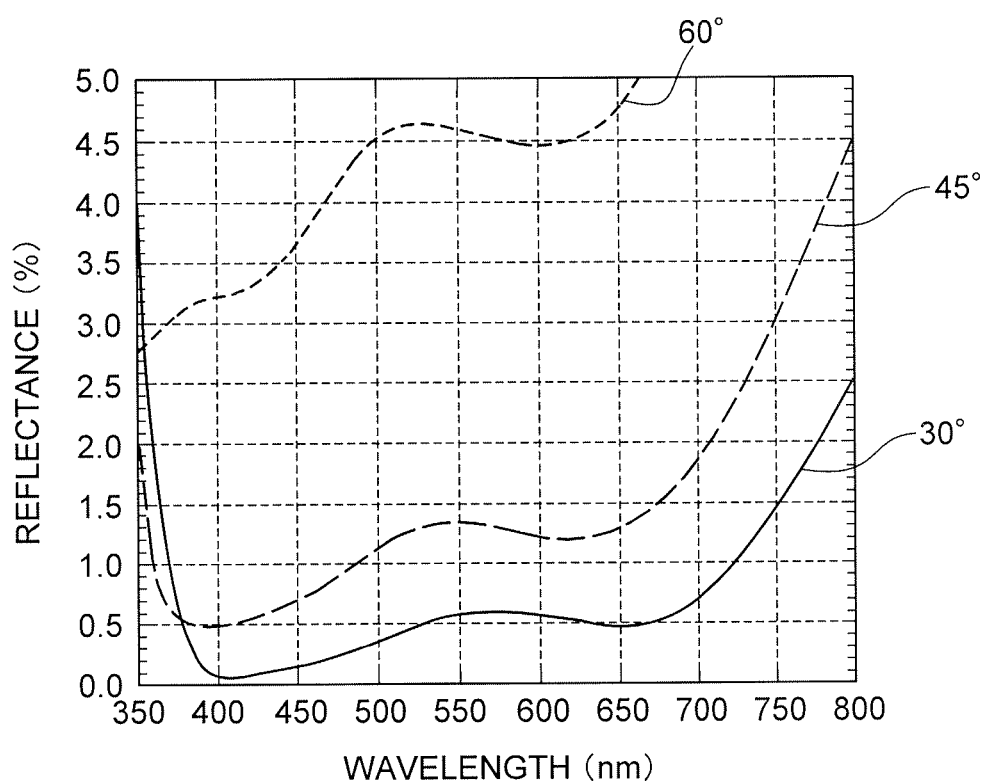
FIG. 16 is a graph showing incident angle dependency of spectral reflectance of the antireflection coating according to the conventional example.

To compare the spectral characteristics of the optical member including the antireflection coating according to the present application illustrated in FIGS. 12 through 14 with the spectral characteristics in the conventional examples shown in FIGS. 15 and 16, it is well understood that the present antireflection coating has much lower reflectance at any incident angles and, besides, has the low reflectance in the broader band.

Then, an example of applying the antireflection coating and a modified example of the antireflection coating shown in Tables 4 and 5 to each Example of the optical system of the present application discussed above is explained.

In the optical system seen from another point of view according to Example 1 of the present application, as shown in the Table 1, the refractive index nd of the positive lens L13 of the first lens group G1 is 1.497820 (nd=1.497820), and the refractive index nd of the positive lens L32 of the third lens group G3 is 1.834807 (nd=1.834807), whereby it is feasible to reduce the reflected light from each lens surface and to reduce ghost images and flare as well by applying the antireflection coating (see Table 5) corresponding to 1.52 as the substrate refractive index to the object side lens surface of the positive lens L13 and the antireflection coating (see Table 4) corresponding to 1.85 as the substrate refractive index to the image side lens surface of the positive lens L32.

In the optical system seen from another point of view according to Example 2 of the present application, as shown in the Table 2, the refractive index nd of the positive lens L13 of the first lens group G1 is 1.497820 (nd=1.497820), and the refractive index nd of the positive meniscus lens L22 of the second lens group G2 and the refractive index nd of the positive meniscus lens L33 of the third lens group G3 are both 1.846660 (nd=1.846660), whereby it is feasible to reduce the reflected light from each lens surface and to reduce ghost images and flare as well by applying the antireflection coating (see Table 5) corresponding to 1.46 as the substrate refractive index to the object side lens surface of the positive lens L13 and applying the antireflection coating (see Table 4) corresponding to 1.85 as the substrate refractive index to the object side lens surface of the positive meniscus lens L22 and the object side lens surface of the positive meniscus lens L33.

In the optical system seen from another point of view according to Example 3 of the present application, as shown in the Table 3, the refractive index nd of the positive lens L22 of the second lens group G2 is 1.846660 (nd=1.846660), and the refractive index nd of the negative meniscus lens L31 of the third lens group G3 is 1.903660 (nd=1.903660), and the refractive index nd of the positive lens L32 of the third lens group G3 is 1.816000 (nd=1.816000), whereby it is feasible to reduce the reflected light from each lens surface and to reduce ghost images and flare as well by applying the antireflection coating (see Table 4) corresponding to 1.85 as the substrate refractive index to all of the object side lens surface of the positive lens L22, the object side lens surface of the negative meniscus lens L31 and the image side lens surface of the positive lens L32.

As described above, each example of the present application makes it possible to realize an optical system excellently suppressing ghost images and flare with excellently controlling variations in various aberrations upon vibration reduction.

The above-described Examples of the present application only show a specific example for the purpose of better understanding of the present application. Accordingly, it is needless to say that the present application in its broader aspect is not limited to the specific details and representative devices. Incidentally, the following description may suitably be applied within limits that do not deteriorate optical performance.

In the above described explanations and Examples, although optical systems having a three-lens-group configuration have been shown, the present application can be applied to other lens configurations such as a four-lens-group configuration, a five-lens-group configuration, and the like. Specifically, a lens configuration in which a lens or a lens group is added to the most object side, or the most image side of the optical system is possible. Incidentally, a lens group is defined as a portion including at least one lens separated by air spaces.

In an optical system according to the present application, in order to vary focusing from infinitely distant object to a close object, a portion of a lens group, a single lens group, or a plurality of lens groups may be moved along the optical axis as a focusing lens group. It is particularly preferable that at least a portion of the second lens group is moved as the focusing lens group. In this case, the focusing lens group can be used for auto focus, and suitable for being driven by a motor such as an ultrasonic motor.

Moreover, in an optical system according to the present application, a lens group or a portion of a lens group may be moved as a vibration reduction lens group in a direction including a component perpendicular to the optical axis, or tilted (swayed) in a direction including the optical axis thereby correcting an image blur caused by a camera shake. In particular, at least a portion of the third lens group is preferably made as the vibration reduction lens group.

In an optical system according to the present application, any lens surface may be a spherical surface, a plane surface, or an aspherical surface.

When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable.

When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. Any lens surface may be a diffractive optical surface, and any lens may be a graded-index type lens (GRIN lens) or a plastic lens.

In an optical system according to the present application, although an aperture stop S is preferably disposed in the third lens group or in the vicinity thereof, the function may be substituted by a lens frame without disposing a member as an aperture stop.

An antireflection coating having high transmittance over a broad wavelength range may be applied to each lens surface in an optical system according to the present application to reduce flare and ghost images, so that high optical performance with a high contrast can be achieved.

Figure 8:
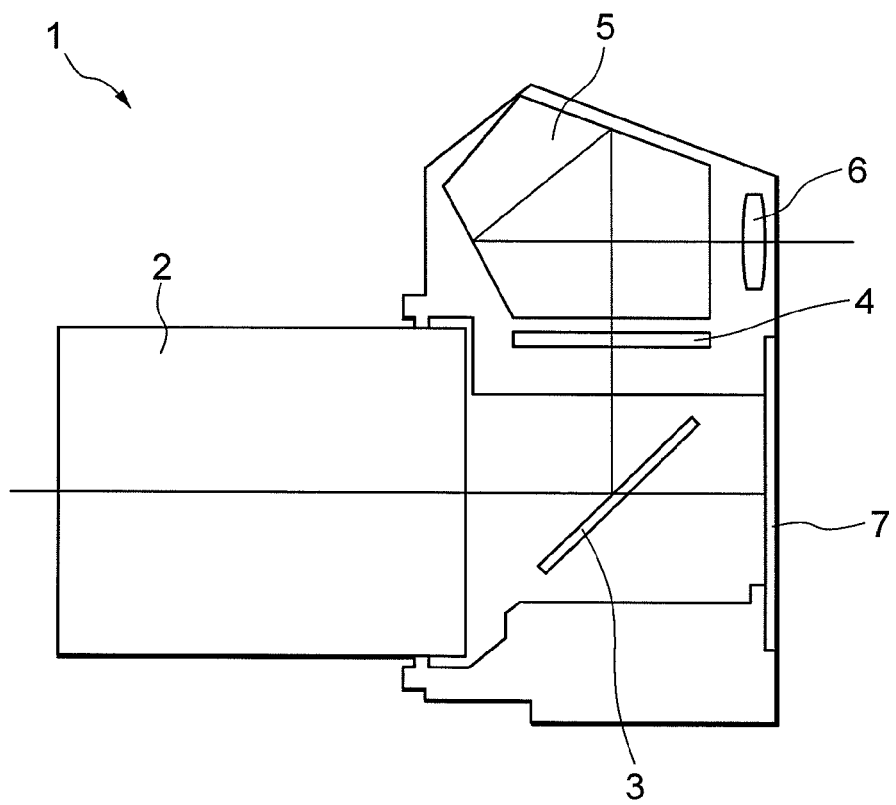
FIG. 8 is a diagram showing a construction of a camera equipped with the optical system according to Example 1 of the present application.

Then, a camera equipped with the optical system according to the present application is explained with reference to FIG. 8. FIG. 8 is a sectional view showing a camera equipped with the optical system according to the present application.

In FIG. 8, the camera 1 is a single-lens reflex digital camera 1 equipped with the optical system according to Example 1 of the present application as an imaging lens 2.

In the camera 1, light rays emitted from an unillustrated object are converged by the imaging lens 2, reflected by a quick return mirror 3, and focused on a focusing screen 4. The light rays focused on the focusing screen 4 are reflected a plurality of times in a pentagonal roof prism 5, and led to an eyepiece 6. Accordingly, a photographer can observe the object image as an erected image through the eyepiece 6.

When the photographer presses an unillustrated release button all the way down, the quick return mirror 3 is retracted from the optical path, the light rays from the unillustrated object are formed an object image on an imaging device 7. Accordingly, the light rays emitted from the object are captured by the imaging device 7, and stored in an unillustrated memory as a photographed image of the object. In this manner, the photographer can take a picture of an object by the camera 1.

As described above, the camera 1 equipped with the optical system according to Example 1 of the present application as an imaging lens 2 makes it possible to realize excellent optical performance with suppressing variations in various aberrations generated upon vibration reduction.

Although a case that the optical system according to Example 1 of the present application is installed is explained, the same result can be obtained by constructing a camera by installing an optical system according to any one of Examples 2 and 3 as an imaging lens 2. Incidentally, the same effect as the above described camera 1 can be obtained by installing the optical system according to any one of Examples according to the present application into a camera including none of the quick return mirror 3.

Then, an outline of a method for manufacturing an optical system according to the present application is explained with reference to FIG. 9.

Figure 9:
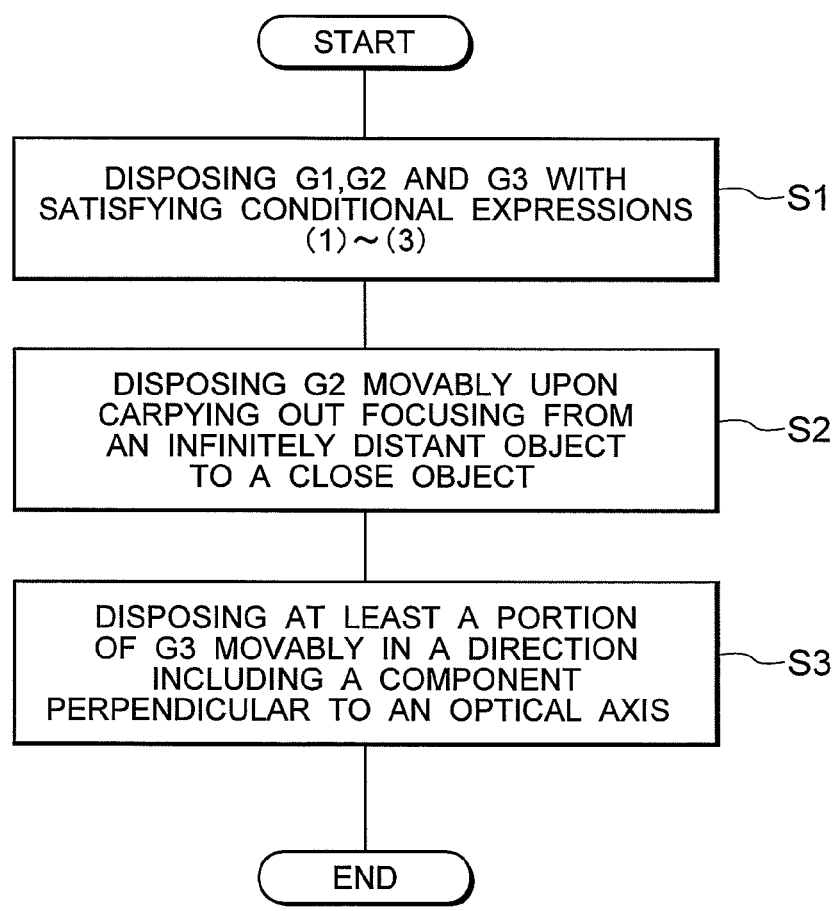
FIG. 9 is a flowchart schematically explaining a method for manufacturing the optical system according to the present application.

FIG. 9 is a flowchart schematically explaining a method for manufacturing the optical system according to the present application.

The method for manufacturing the optical system according to the present application is a method for manufacturing a zoom lens system including, in order from an object side, a first lens group having positive refractive power, a second lens group having negative refractive power, and a third lens group having positive refractive power, the method comprising the following steps S1 through S3.

Step S1: disposing the first lens group, the second lens group and the third lens group with satisfying the following conditional expressions (1), (2) and (3):

$$0.30 < f1/f < 0.60 \quad (1)$$

$$0.10 < (-f2)/f < 0.60 \quad (2)$$

$$0.30 < f3/f < 0.60 \quad (3)$$

where f denotes a focal length of the optical system, f1 denotes a focal length of the first lens group, f2 denotes a focal length of the second lens group, and f3 denotes a focal length of the third lens group.

Step S2: disposing the second lens group movably by means of a well-known moving mechanism upon carrying out focusing from an infinitely distant object to a close object.

Step S3: disposing at least a portion of the third lens group movably in a direction including a component perpendicular to an optical axis by means of a well-known moving mechanism.

With this method for manufacturing an optical system, it becomes possible to manufacture an optical system capable of suppressing variations in aberrations upon vibration reduction.

Then, an outline of a method for manufacturing an optical system seen from another point of view according to the present application is explained with reference to FIG. 10.

Figure 10:
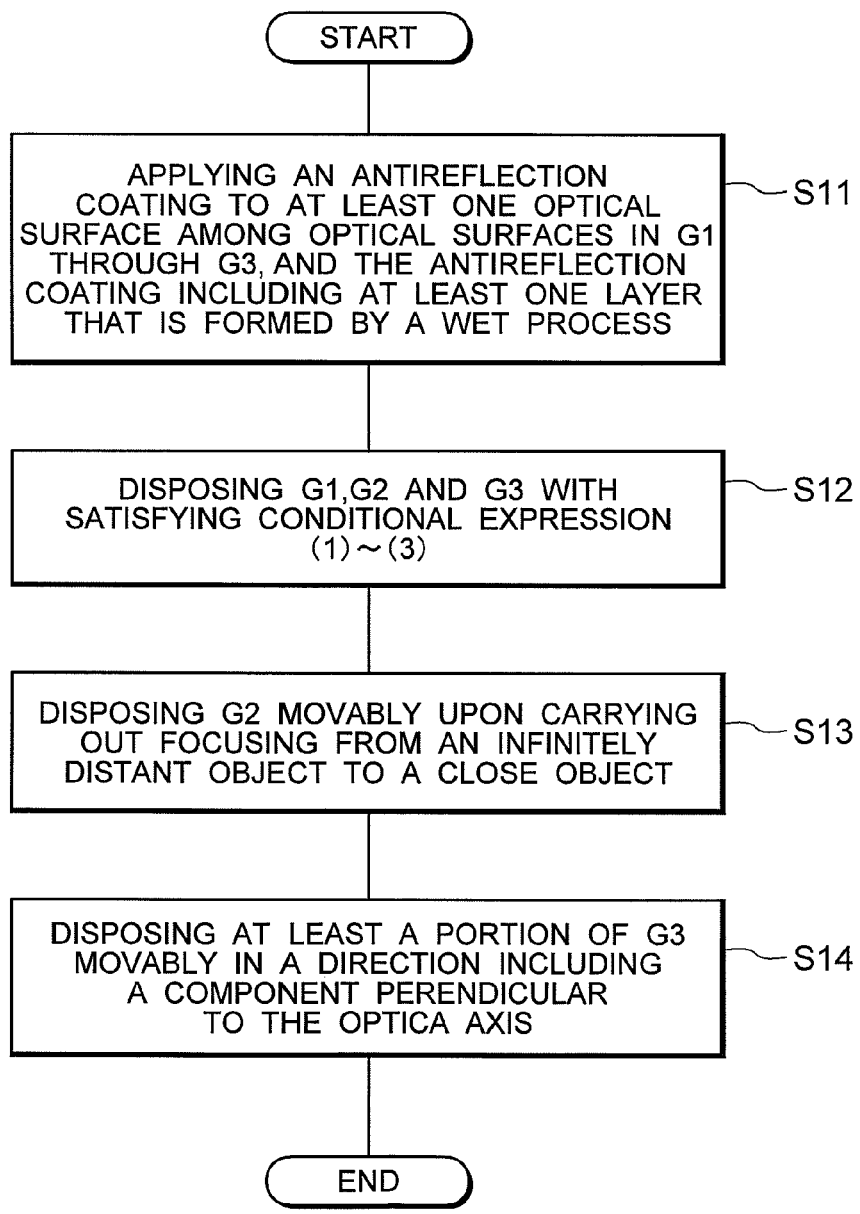
FIG. 10 is a flowchart schematically explaining a method for manufacturing the optical system seen from another point of view according to the present application.

FIG. 10 is a flowchart schematically explaining a method for manufacturing the optical system seen from another point of view according to the present application.

The method for manufacturing an optical system seen from another point of view according to the present application is a method for manufacturing an optical system including, in order from an object side, a first lens group having positive refractive power, a second lens group having negative refractive power, and a third lens group having positive refractive power, the method comprising the following steps S11 through S14.

Step S11: applying an antireflection coating to at least one optical surface among optical surfaces in the first lens group through the third lens group, and the antireflection coating including at least one layer that is formed by a wet process.

Step S12: disposing the first lens group, the second lens group and the third lens group into a lens barrel in order from the object side with satisfying the following conditional expressions (1) through (3):

$$0.30 < f1/f < 0.60 \quad (1)$$

$$0.10 < (-f2)/f < 0.60 \quad (2)$$

$$0.30 < f3/f < 0.60 \quad (3)$$

where f denotes a focal length of the optical system, f1 denotes a focal length of the first lens group, f2 denotes a focal length of the second lens group, and f3 denotes a focal length of the third lens group.

Step S13: disposing the second lens group movably by means of a well-known moving mechanism upon carrying out focusing from an infinitely distant object to a close object.

Step S14: disposing at least a portion of the third lens group movably by means of a well-known moving mechanism in a direction including a component perpendicular to the optical axis.

With this method for manufacturing an optical system seen from another point of view according to the present application, it becomes possible to manufacture an optical system capable of excellently suppressing variations in aberrations upon vibration reduction with suppressing ghost images and flare.

What is claimed is:

1. An optical system comprising, in order from an object side:
   a first lens group having positive refractive power;
   a second lens group having negative refractive power; and
   a third lens group having positive refractive power,
   the second lens group being moved upon carrying out focusing from an infinitely distant object to a close object, at least a portion of the third lens group being movable in a direction including a component perpendicular to an optical axis, the at least a portion of the third lens group being a negative lens group having refactive power, and the following conditional expressions being satisfied:

$0.30 < f1/f < 0.60$ $0.20 < (-f2)/f < 0.60$ $0.30 < f3/f < 0.60$ $0.50 < (-fVR)/f3 < 1.00$ where f denotes a focal length of the optical system, f1 denotes a focal length of the first lens group, f2 denotes a focal length of the second lens group, f3 denotes a focal length of the third lens group, and fVR denotes a focal length of the negative lens group in the third lens group.

2. The optical system according to claim 1, wherein the third lens group includes a first positive lens group having positive refractive power disposed to the object side of the negative lens group, and a second positive lens group having positive refractive power disposed to the image side of the negative lens group.

3. The optical system according to claim 2, wherein the following conditional expression is satisfied:

$0.60 < (-fVR)/fp2 < 1.50$ where fVR denotes a focal length of the negative lens group in the third lens group, and fp2 denotes a focal length of the second positive lens group in the third lens group.

4. The optical system according to claim 2, wherein the first positive lens group in the third lens group consists of a cemented lens constructed by a positive lens cemented with a negative lens.

5. The optical system according to claim 1, wherein the second lens group includes two negative lenses and one positive lens.

6. The optical system according to claim 1, wherein an antireflection coating is applied on at least one optical surface of the first through third lens groups, and the antireflection coating includes at least one layer that is formed by a wet process.

7. The optical system according to claim 6, wherein the antireflection coating is a multi-layered film, and the layer formed by the wet process is the outermost layer among the layers composing the multi-layered film.

8. The optical system according to claim 6, wherein when a refractive index at d-line of the layer formed by the wet process is denoted by nd, the refractive index nd is 1.30 or less.

9. The optical system according to claim 6, wherein an optical surface on which the antireflection coating is applied is a concave surface seen from an aperture stop.

10. The optical system according to claim 9, wherein the concave surface seen from the aperture stop on which the antireflection coating is applied is an image side lens surface.

11. The optical system according to claim 9, wherein the concave surface seen from the aperture stop on which the antireflection coating is applied is an object side lens surface.

12. The optical system according to claim 6, wherein an optical surface on which the antireflection coating is applied is a concave surface seen from the object side.

13. The optical system according to claim 12, wherein the concave surface seen from the object side is an object side lens surface in the second lens group.

14. The optical system according to claim 6, wherein an optical surface on which the antireflection coating is applied is a concave surface seen from the image side.

15. The optical system according to claim 14, wherein the concave surface seen from the image side is an object side lens surface in the third lens group.

16. The optical system according to claim 6, wherein the following conditional expression is satisfied:

$0.50 < |fVR|/f3 \leq 1.00$ where fVR denotes a focal length of the at least a portion of the third lens group, and f3 denotes a focal length of the third lens group.

17. The optical system according to claim 6, wherein the at least a portion of the third lens group is a negative lens group having negative refractive power.

18. The optical system according to claim 17, wherein the third lens group includes a first positive lens group having positive refractive power disposed to the object side of the negative lens group, and a second positive lens group having positive refractive power disposed to the image side of the negative lens group.

19. The optical system according to claim 18, wherein the following conditional expression is satisfied:

$0.60 < (-fVR)/fp2 < 1.50$ where fVR denotes a focal length of the negative lens group in the third lens group, and fp2 denotes a focal length of the second positive lens group in the third lens group.

20. The optical system according to claim 18, wherein the first positive lens group in the third lens group consists of a cemented lens constructed by a positive lens cemented with a negative lens.

21. The optical system according to claim 6, wherein the second lens group includes two negative lenses and one positive lens.

22. An optical apparatus equipped with the optical system according to claim 1.

23. A method for manufacturing an optical system including, in order from an object side, a first lens group having positive refractive power, a second lens group having negative refractive power, and a third lens group having positive refractive power, the method comprising steps of:

disposing the first lens group, the second lens group and the third lens group with satisfying the following conditional expressions:

$0.30 < f1/f < 0.60$ $0.20 < (-f2)/f < 0.60$ $0.30 < f3/f < 0.60$ where f denotes a focal length of the optical system, f1 denotes a focal length of the first lens group, f2 denotes a focal length of the second lens group, and f3 denotes a focal length of the third lens group;

disposing the second lens group to be movable upon carrying out focusing from an infinitely distant object to a close object; and disposing at least a portion of the third lens group to be movable in a direction including a component perpendicular to an optical axis, the at least apportion of the third lens group being a negative lens group having negative refractive power, and the following conditional expression being satisfied:

$0.50 < (-fVR)/f3 < 1.00$ where fVR denotes a focal length of the negative lens group in the third lens group.

24. The method according to claim 23, further including a step of:

applying an antireflection coating on at least one optical surface among optical surfaces of the first lens group through the third lens group, and the antireflection coating including at least one layer that is formed by a wet process.

* * * * *